United States Patent
Takeda et al.

(10) Patent No.: US 7,286,520 B2
(45) Date of Patent: Oct. 23, 2007

(54) MOBILE TERMINAL EQUIPMENT AND PACKET COMMUNICATION METHOD BETWEEN TERMINALS

(75) Inventors: Yukiko Takeda, Tokorozawa (JP); Hidenori Inouchi, Higashimurayama (JP); Takehiro Morishige, Hachioji (JP); Koh Ohnishi, Yokohama (JP); Kiyoshi Ichikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 759 days.

(21) Appl. No.: 10/615,795

(22) Filed: Jul. 10, 2003

(65) Prior Publication Data

US 2004/0105420 A1 Jun. 3, 2004

(30) Foreign Application Priority Data

Dec. 3, 2002 (JP) ............................. 2002-351510

(51) Int. Cl.
*H04Q 7/24* (2006.01)
(52) U.S. Cl. ...................... 370/349; 370/338; 370/332; 455/433
(58) Field of Classification Search ................ 370/349, 370/338, 332; 455/433
See application file for complete search history.

(56) References Cited

U.S. PATENT DOCUMENTS

| | | | |
|---|---|---|---|
| 7,072,317 B2* | 7/2006 | Vakil et al. ................. | 370/332 |
| 2001/0053694 A1* | 12/2001 | Igarashi et al. ............. | 455/433 |
| 2002/0009066 A1* | 1/2002 | Shimizu et al. ............. | 370/338 |
| 2004/0071120 A1* | 4/2004 | Grech ........................ | 370/338 |

FOREIGN PATENT DOCUMENTS

JP 2002-290478 3/2001

OTHER PUBLICATIONS

David B. Johnson, Charles E. Perkins and Jari Arkko, "Mobility Support in IPv6 ,draft-ietf-mobileip-ipv6-18.txt>, Work in Progress", IETF Mobile IP Working Group, Jun. 2002.
C. Perkins, "IP Mobility Support for IPv4": IETF RFC3220, Network Working Group, Jan. 2002.
Charles Perkins and David B. Johnson,"Route Optimization in Mobile IP ,draft-ietf-mobileip-optim-11.txt> Work in Progress", Mobile IP Working Group, Sep. 2001.
J. Rosenberg, H. Schulzrinne, G. Camarillo, A. Johnston, J. Peterson, R. Sparks, M. Handley and E. Schooler, "SIP: Session Initiation Protocol", IETF RFC3261, Network Working Group, Jun. 2002.
M. Handley and V. Jacobson, "SDP: Session Description Protocol", IETF RFC2327, Network Working Group, Apr. 1998.
S. Olson, G. Camarillo and A. B. Roach, "Support for IPv6 in Session Description Protocol (SDP)", IETF RFC3266, Network Working Group, Jun. 2002.

* cited by examiner

*Primary Examiner*—Joseph Feild
*Assistant Examiner*—Michael T. Vu
(74) *Attorney, Agent, or Firm*—Reed Smith LLP; Stanley P. Fisher, Esq.; Juan Carlos A. Marquez, Esq.

(57) ABSTRACT

A mobile terminal having a packet communication function according to a mobile IP and a communication route optimizing function includes a session controller for setting a session between terminals in accordance with a session control message of a protocol different from the mobile IP. When a session control message from the other party is received in a visited mobile IP network, the session controller executes optimization of a communication route to the other party by the communication route optimizing function before transmitting a response for the received message.

11 Claims, 25 Drawing Sheets

HOME AGENT 10

BINDING CACHE MANAGEMENT TABLE 171

| HOME ADDRESS 1711 | CoA 1712 | LIFETIME 1713 | SEQUENCE NUMBER FOR AUTHENTICATION 1714 | OTHERS 1715 |
|---|---|---|---|---|
|  |  |  |  |  | ~1710-1
|  |  |  |  |  | ~1710-2
| ⋮ | ⋮ | ⋮ | ⋮ | ⋮ |

FIG.5

SIP INFORMATION MANAGEMENT TABLE 271

| SIP IDENTIFIER (SIP-URI) | TERMINAL LOCATION INFORMATION | EXPIRES | CALL-ID | SEQUENCE NUMBER (CSeq) | |
|---|---|---|---|---|---|
| xxxxxxxxx | xxxxxxxx | xxxxxx | xxxxxx | xxxx | 2710-1 |
| xxxxxxxxx | xxxxxxxx | xxxxxx | xxxxxx | xxxx | 2710-2 |
| ⋮ | ⋮ | ⋮ | ⋮ | ⋮ | |
| userMN@home.com | userMN@mn6 | xxxxxx | | | 2710-n |
| | | | | | |

Column labels: 2711, 2712, 2713, 2714, 2715

IPv6 PACKET 50

ROUTER ADVERTISEMENT MESSAGE 60

BINDING ACKNOWLEDGEMENT MESSAGE 70B

SIP MESSAGE PROTOCOL STACK

SIP REGISTER MESSAGE 80A

FIG.16

SIP INVITE MESSAGE 80B

| INVITE    sip : user MN@home.com  SIP/2.0 |
|---|

START LINE 81

| Via   : SIP/2.0/UDP cn6 |
|---|
| From : sip : user CN@home.com ; tag=123 |
| To    : sip : user MN@home.com |
| Call-ID : 12345@cn6 |
| CSeq   : 1 INVITE |
| Contact : <sip : user CN@cn6> |
| Content-Type : application/sdp |

MESSAGE-HEADER 82

| v = 0 |
|---|
| o = User C 123 456 IN IP6 user CN.home.com |
| c = IN IP6 cn6 |
| m = audio 45678 |

MESSAGE-BODY 83

CORRESPONDENCE TABLE OF
MN HOME ADDRESS AND HA ADDRESS 273

| MN HOME ADDRESS (2731) | HA ADDRESS (2732) | |
|---|---|---|
|  |  | 2730-1 |
|  |  | 2730-2 |
| ⋮ | ⋮ | |

BINDING REFRESH REQUEST MESSAGE 70C

HOME AGENT 10

HOME AGENT 10

FIG.30

SIP REGISTER MESSAGE 80C

REGISTER    sip : home.com  SIP/2.0
Via   : SIP/2.0/UDP home.com
— START LINE 81

From : sip : user MN@home.com
To    : sip : user MN@home.com
Call-ID : 12345600@home.com
CSeq   : 1 REGISTER
Contact : <sip : user MN@mn6>
Expires : 7200
HomeAgent : ha6
— MESSAGE-HEADER 82

MOBILE TERMINAL EQUIPMENT AND PACKET COMMUNICATION METHOD BETWEEN TERMINALS

BACKGROUND OF THE INVENTION (1) Field of the Invention

The present invention relates to mobile terminal equipment and a packet communication method between terminals and, more particularly, to mobile terminal equipment to which a mobile IP (Internet Protocol) is applied and a packet communication method between terminals in a mobile communication system.

(2) Description of the Related Art

In recent years, application of an IP (Internet Protocol) to a mobile communication network is being actively studied. For example, as described in "Mobility Support in IPv6 <draft-ietf-mobileip-ipv6-18.txt>, Work in Progress", the IETF (Internet Engineering Task Force) is standardizing the Mobile IPv6 specification. Mobile IPv6 basically inherits the functions of a mobile IP conformed with IPv4 specified in IETF RFC3220.

A mobile IPv6 network is comprised of a mobile node MN, a home agent HA, and a correspondent node CN. To the mobile node MN, an permanent IP address (home address) which does not change even when the mobile node MN moves is assigned. A link having the same prefix value as the home address is called a home link. When moved to a link other than the home link, the mobile node MN obtains an IP address to be used in the foreign link. The address is called a care of address (CoA).

The mobile node MN receives a router advertisement signal periodically sent from a router installed in a foreign link. When it is detected that the received router advertisement signal has a prefix value different from the home address or the present CoA, the mobile node MN recognizes that it moved to another link. When the mobile node MN detects that it has moved to a new link, the mobile node MN transmits a location registration request (BINDING UPDATE) message to the home agent HA.

On reception of the control message (BINDING UPDATE), the home agent HA stores the binding information of the home address and the care of address CoA of the mobile node MN indicated in the received message into a binding cache management table. After that, to intercept packets addressed to the mobile node MN, the home agent HA multicasts a control message (GRATUITOUS NEIGHBOR ADVERTISEMENT) to neighboring routers and, thereafter, operates as a proxy server of the mobile node MN.

To communicate a message in the mobile IPv6 specification between the mobile node MN and the correspondent node CN, the node CN also has to be adapted to mobile IPv6. In the mobile IPv6 specification, for example, packet transmission from the node CN to the mobile node MN is carried out in the following procedure.

The node CN transmits a packet to the home address of the mobile node MN. The packet is intercepted by the home agent HA. After intercepting the packet addressed to the home address, the home agent HA retrieves the care of address CoA corresponding to the home address from the binding cache management table, adds an IP header (encapsulation) having the CoA as a destination address to the packet, and transmits the encapsulated received packet to a network.

The packet addressed to the CoA is transferred to the link where the mobile node MN exists and is received by the mobile node MN. Upon receiving the packet, the mobile node MN removes the IP header (decapsulation) added by the home agent HA, thereby obtaining the original packet transmitted from the correspondent node CN. At this time, the mobile node MN searches a binding update list on the basis of the IP address of the transmission source node CN indicated in the received packet. The binding update list is a table provided in the mobile node MN for storing transmission destination information of a binding update message.

When there is no entry for the node CN in the binding update list, the mobile node MN transmits a control message (BINDING UPDATE) for notifying the node CN of a correspondence relation between the home address of the mobile node MN and the care of address CoA.

Upon receiving the binding update message, the node CN registers the correspondence relation between the home address of the mobile node MN and the CoA indicated in the received message into a binding cache table of the node CN. It enables the node CN to transmit a packet, which is generated after that and destined to the mobile node MN, through an optimum communication path by applying the care of address CoA indicated in the binding cache table as the destination address of the packet. An IP packet transmitted from the node CN to the mobile node MN includes the home address of the mobile node MN in an extension header for controlling the IPv6 route.

As described in, for example, "Route Optimization in Mobile IP <draft-ietf-mobileip-optim-11.txt> Work in Progress", IETF is working on route optimization in mobile IPv4. The route optimization in mobile IPv4 is realized by sending a notification of CoA corresponding to the home address of the mobile node MN from the home agent HA to the correspondent node CN.

On the other hand, in the field of the IP network, VOIP (Voice over IP) technique of transmitting voice by IP packets is also being examined. In the VOIP, a virtual communication path or session is established between communication apparatuses prior to start of communication, and voice data is transferred in the form of IP packets on the session. Establishment, maintenance, and disconnection of the session between the communication apparatuses is controlled according to a session control protocol.

IETF has specified an SIP (Session Initiation Protocol) for establishing and releasing a session in an IP multimedia communication (IETF RFC3261). Attention is being paid to the SIP as a session control protocol of VoIP because of high extensibility of the function.

The SIP is an application protocol using transport mechanism such as the TCP (Transmission Control Protocol) or UDP (User Datagram Protocol). The SIP is a text-base protocol and an SIP message is comprised of a header carrying a request or response and a message body describing the session contents. To the session description for SIP, for example, SDP (Session Description Protocol) is applied (IETF RFC2327 and IETF RFC3266).

Since the SIP employs the architecture of a client/server model. An origination client transmits an SIP request to a proxy server (SIP server) of a destination client. The SIP server specifies the address of a destination node by using, for example, DNS (Domain Name System) or the like and establishes a session between the client nodes.

The operation modes of the SIP server are classified into a proxy mode and a redirect mode according to the role of the SIP server. In the proxy mode, a request of establishment of a session between the origination client and the destination client is relayed by the proxy server. In the redirect mode, the origination client obtains information of the destination client from the SIP server and directly communicates with the destination client.

In the case where a terminal X and a terminal Y in an IP network performs voice communication via the SIP server in the proxy mode, the terminal X transmits a call establishment request (INVITE) message to the SIP server in advance of communication with the terminal Y. Upon receiving the call setting request message (INVITE), the SIP server specifies location information of the terminal Y, and transfers the received message (INVITE) to the terminal Y. The terminal Y having received the call establishment request transmits a response message (200 OK) indicative of the acceptance of the call. The response message is transmitted to the terminal X via the SIP server through which the call establishment request was relayed.

Upon receiving the response message, the terminal X transmits a response acknowledge (ACK) message to the terminal Y. The response acknowledge (ACK) message is transmitted via the SIP server or directly from the terminal X to the terminal Y. When the terminal Y receives the response acknowledge (ACK), a session is established between the terminals X and Y. Usually, each of the call establishment request message and the response message includes session description information necessary for transferring data packets (voice packets) between the terminals X and Y. The terminal X (terminal Y) transmits data packets to a destination address designated in the session description by the correspondent terminal Y (terminal X).

In the SIP, the other party is identified on the basis of an SIP URI (SIP Uniform Resource Identifier). Each client registers its location information, for example, IP address in a registrar. The registrar transmits the location information received from the client to a location server, and the location server stores a correspondence relation between the SIP URI and the location information of the client into an SIP information management table. The SIP server may be provided with the functions of the registrar and the location server.

When the mobile node MN of the mobile IP moves in a communication network (hereinbelow, called visited network) away from the home network of the mobile IP, the mobile node MN notifies the mobile IP home agent HA of the care of address CoA obtained in the visited network, whereby the home agent HA operates as a proxy of the mobile node MN. The correspondent terminal CN transmits a packet to the home address of the mobile node MN. The packet is intercepted by the home agent HA and encapsulated with the IP header including the care of address of the mobile node MN as the destination address. The encapsulated packet is transferred to the mobile node MN.

That is, a data packet transmitted from the correspondent node CN (or mobile node MN) to the mobile node MN (or correspondent node CN) is transferred through the home agent HA until the process of optimizing the communication route of the mobile IP is completed between the mobile node MN and the correspondent node CN. In this case, since the communication between the mobile node MN and the home agent HA is performed in a form of an encapsulated packet obtained by adding an encapsulation IP header to an original packet, overhead for packet transfer control increases. It causes a problem such that delay time until a packet arrives at a destination terminal increases.

When the communication route optimizing process is executed during communication of data packets, a difference occurs between packet transfer time before route optimization and packet transfer time after route optimization. These problems are more serious in the case of providing VOIP service in the mobile IP communication network.

SUMMARY OF THE INVENTION

An object of the invention is to provide mobile terminal equipment and a packet communication method between terminals realizing shortened transfer delay time of data packets on a mobile IP communication network and reduced fluctuation in transfer time.

Another object of the invention is to provide mobile terminal equipment and a packet communication method between terminals capable of optimizing a communication route between terminals in a mobile IP communication network at a proper timing.

Further another object of the invention is to provide mobile terminal equipment and a packet communication method between terminals capable of optimizing a communication route of a session control message between a server for session control and mobile terminal equipment or correspondent equipment in a mobile IP communication network at a proper timing.

To achieve the object, according to the invention, mobile terminal equipment having a packet communication function and a communication route optimizing function according to a mobile IP has a session controller for establishing a session between terminals in accordance with a session control message of a protocol different from the mobile IP. The session controller includes means for executing, when the session control message from the other party is received in a communication network (hereinbelow, called a visited network) apart from a mobile IP home network, optimization of a communication route to the other party by the communication route optimizing function before sending a response message for the session control message.

The session controller, for example, specifies an IP address of the other party from the session control message received in the visited network and executes optimization of a communication route to the IP address by the optimizing function.

More specifically, the mobile terminal equipment according to the invention includes: means for storing a home address of the mobile IP preliminarily assigned and an identifier of the mobile terminal equipment to be used in the session control; means for notifying, when an IP care of address which becomes necessary for receiving mobile IP packets is obtained in a visited network, a first server operating as a mobile IP home agent of a correspondence relation between the IP care of address and the home address; and means for notifying a second server for session control of a correspondence relation between the mobile terminal identifier and the home address. A session control message packet transmitted from the other party to the second server is intercepted by the first server in accordance with the home address, and transferred to the mobile terminal equipment in the visited network in accordance with the IP care of address stored in the first server.

The mobile IP protocol is, for example, an IPv6 protocol, and the session control message is, for example, according to an SIP (Session Initiation Protocol) specified in IETF RFC3261. Alternately, the session control message may be according to ITU-T recommendation H.323.

According to the invention, a packet communication method between first and second terminals each having a packet communication function and a communication route optimizing function according to a mobile IP, comprising the steps of: transmitting a session control message from the second terminal to the first terminal when the first terminal exists in a visited network apart from a mobile IP home network; executing a communication procedure for optimizing a communication route to the second terminal by the first terminal on reception of the session control message; and transmitting a response message for the session control message from the first terminal after completion of the communication route optimization, wherein the first and second terminals communicate data packets generated after completion of the session control through the optimized communication route.

The session control message sent from the second terminal is, for example, transferred to the first terminal via a second server for session control and a first server operating as a mobile IP home agent of the first terminal, and the response message sent from the first terminal is transferred to the second terminal via the first and second servers.

More specifically, the packet communication method according to the invention is characterized in that when the first terminal obtains an IP care of address necessary for receiving mobile IP packets in a visited network, the first terminal notifies the first server of a correspondence relation between a home address of the first terminal and the care of address, and notifies the second server of a correspondence relation between a terminal identifier and the home address of the first terminal, the second terminal transmits the session control message designating the identifier of the first terminal to the second server, the second server transfers the session control message to the home address of the first terminal, and the first server intercepts the session control message and transfers the session control message to the care of address.

The packet communication method according to the invention is also characterized by including the step of obtaining by the second server a correspondence relation between the home address and the care of address of the first terminal from the first server. In this case, the second terminal sends the session control message in an IP packet form including the address of the second server as a destination IP address, and the second server transfers to the first terminal the IP packet including the session control message received from the second terminal, in a form encapsulated with an IP header including the care of address of the first terminal as a destination address.

The packet communication method according to the invention is also characterized by further including the step of notifying the second server, from the first server notified of the correspondence relation between the home address and the care of address from the first terminal, of a correspondence relation between the home address of the first terminal and a home agent IP address of the first server, wherein the second server specifies the first server on the basis of the home agent IP address and performs communication to obtain a correspondence relation between the home address and the care of address of the first terminal.

The other objects and features of the invention will become apparent from description of embodiments made with reference to the drawings.

BRIEF DESCRIPTION OF THE DRAWINGS

FIG. 5 is a diagram showing an example of the configuration of an SIP information management table 271 of the SIP server 20.

FIG. 16 is a diagram showing an example of an SIP "INVITE" message sent from a terminal 40.

FIG. 30 is a diagram showing an example of an SIP "REGISTER" message 80C transmitted from the home agent 10.

DESCRIPTION OF THE PREFERRED EMBODIMENTS

Embodiments of the invention will be described hereinbelow with reference to the drawings.

Figure 1:
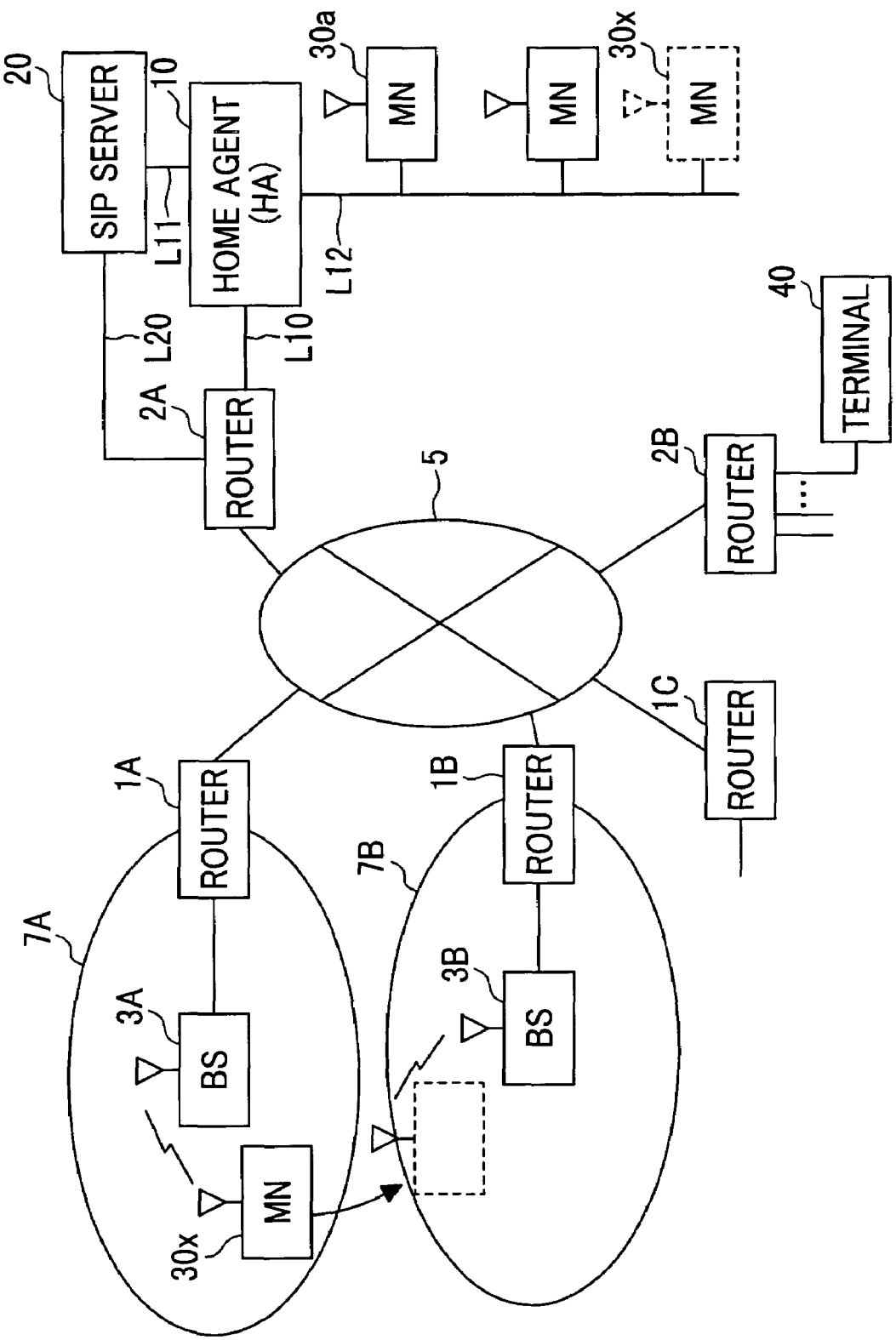
FIG. 1 is a diagram showing an example of the configuration of a communication network to which the invention is applied.

FIG. 1 shows an example of the configuration of a communication network to which the invention is applied. Numeral 1 (1A, 1B, 1C, ...) denotes routers for mobile communication network connected to a network 5 and connected to radio base stations 3 (3A, 3B, 3C, ...). Numeral 2 (2A and 2B) denotes general routers connected to the network 5. To the router 2A, a home agent (HA) 10 and an SIP server 20 are connected via lines L10 and L20, respectively. To the router 2B, a terminal (or host) 40 is connected.

The home agent 10 is connected to the SIP server 20 via a line L11 and accommodates a plurality of mobile terminals 30a to 30x via a link L12. The link L12 is a home network of the mobile terminals (hereinbelow, called mobile nodes) 30a to 30x.

In the following embodiment, a communication procedure will be described in the case where the mobile node 30x performs communication with the terminal 40, in a state where it moves from the home link (hereinbelow, called home network) L12 to another communication network (hereinbelow, called visited network), for example, a communication area 7A of the radio base station 3A connected to the router 1A or from the communication area 7A to a communication area 7B of the radio base station 3B connected to the router 1B. In the embodiment, the visited networks 7A and 7B and the home network L12 are mobile IPv6 networks, the mobile node 30x is a mobile node MN supporting mobile IPv6, and the terminal 40 is a correspondent terminal CN supporting mobile IPv6.

The home agent 10 has the function of managing location information of the mobile node MN residing in an area other than the home network L12, intercepting a packet transmitted to the home address of the mobile node MN, and transferring the packet to the mobile node MN in the visited network.

Figure 2:
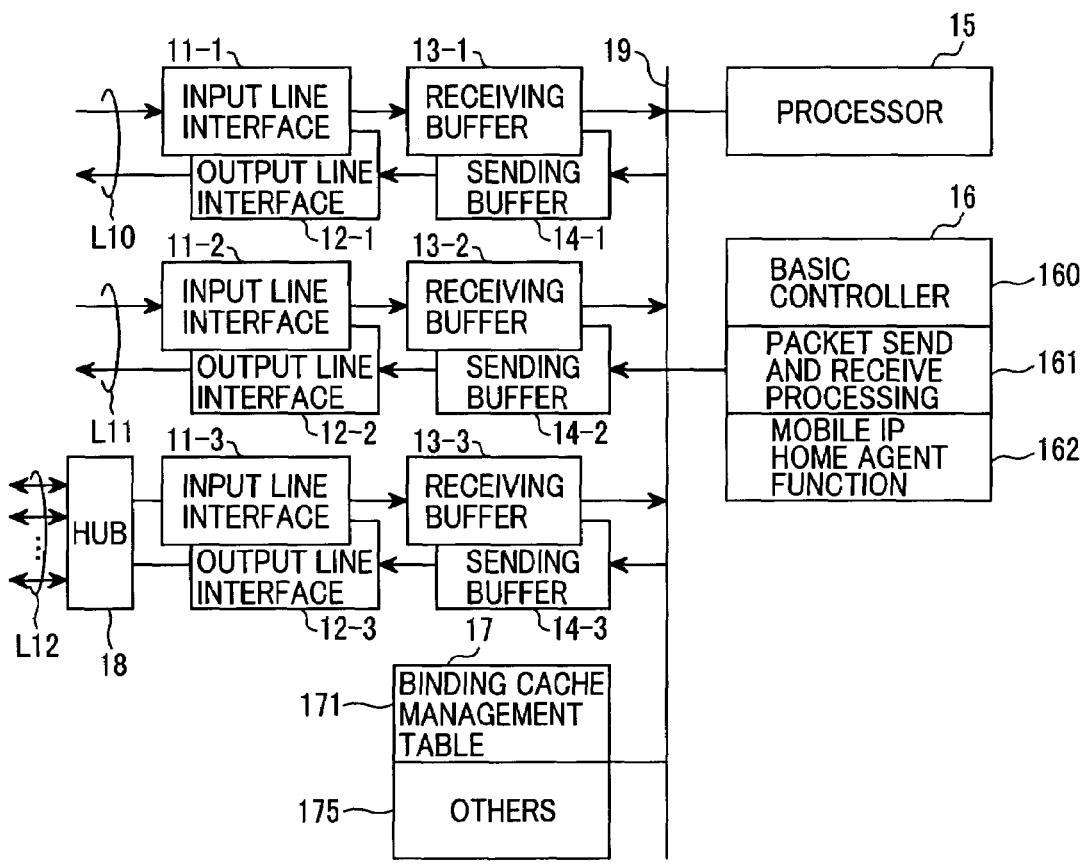
FIG. 2 is a diagram showing an example of the configuration of a home agent 10 illustrated in FIG. 1.

FIG. 2 shows an example of the configuration of the home agent 10.

The home agent 10 is comprised of input line interfaces 11 (11-1 to 11-3) and output line interfaces 12 (12-1 to 12-3) for accommodating the lines L10, L11, and L12, receiving buffers 13 (13-1 to 13-3) each connected between one of the input line interfaces 11 and an internal bus 19, sending buffers 14 (14-1 to 14-3) each connected between one of the output line interfaces 12 and the internal bus 19, and a processor 15, a program memory 16 and a data memory 17 which are connected to the internal bus 19.

The home link L12 is comprised of a plurality of lines corresponding to the terminals 30a to 30x which are connected to the input line interface 11-3 and the output line interface 12-3 via a hub 18. To each of the terminals 30a to 30x, an IP address having a prefix value which is the same as the IP address of the input line interface 11-3 is assigned as the home address.

The program memory 16 includes, as programs executed by the processor 15, a packet send and receive processing routine 161, a mobile IP home agent function routine 162 having a mobile IP protocol processing function, and a basic control routine 160 for selectively starting the routines 161 and 162. In the data memory 17, a binding cache management table 171 to be referred to by the mobile IP home agent function routine 162 and the other data area 175 including, for example, a routing table and the like are formed.

Packets stored in the receiving buffers 13-1 to 13-3 are sequentially read out by the packet send and receive processing routine 161 and passed to the basic control routine 160. The basic control routine 160 checks the destination address of a received packet. If the received packet is an IP packet to be sent to any of the terminals in the home network, the basic control routine 160 transfers the received packet to the sending buffer 14-3 via the packet send and receive processing routine 161. An encapsulated received packet is decapsulated by the basic control routine 160. A received packet addressed to the home agent is processed by the mobile IP home agent function routine 162.

Figures 3, 4:
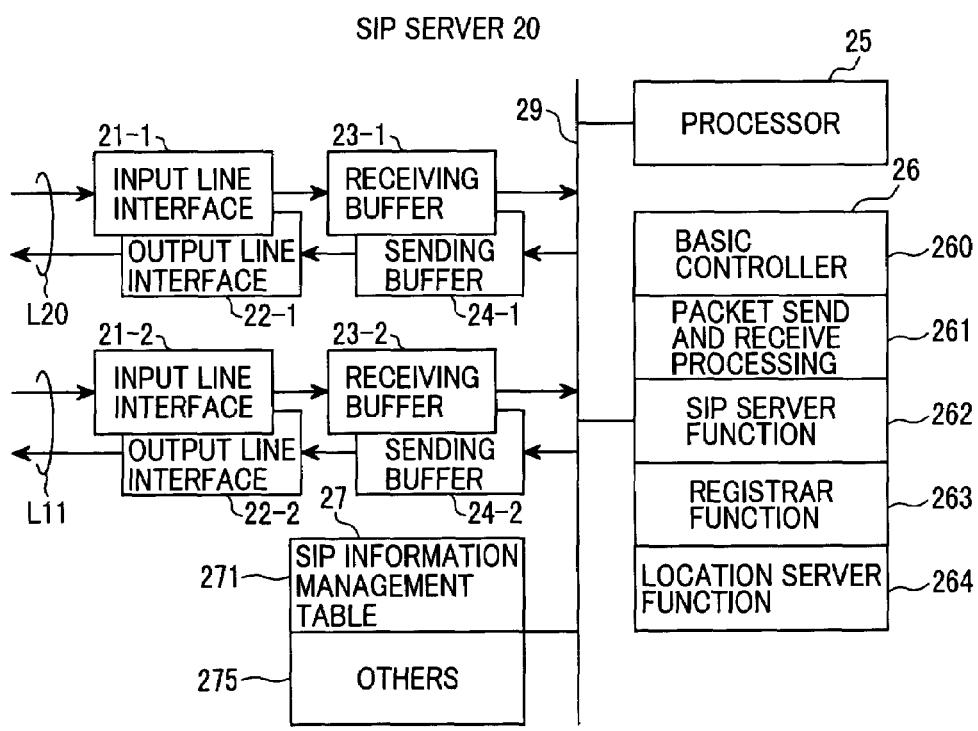
FIG. 3 is a diagram showing an example of the configuration of a binding cache management table 171 of the home agent 10.
FIG. 4 is a diagram showing an example of the configuration of an SIP server 20 illustrated in FIG. 1.

FIG. 3 shows an example of the configuration of the binding cache management table 171.

In the binding cache management table 171, a plurality of binding cache entries 1710-1, 1710-2, ... each corresponding to a home address 1711 of a mobile node MN are registered. Each entry includes a care of address (CoA) 1712 obtained by the mobile node MN in a visited network, lifetime 1713 indicative of an effective period of a binding cache entry, sequence number 1714 for authentication of a location registration request received from the mobile node MN, and other information 1715.

FIG. 4 shows an example of the configuration of the SIP server 20.

The SIP server 20 is comprised of input line interfaces 21 (21-1 and 21-2) and output line interfaces 22 (22-1 and 22-2) for accommodating the lines L20 and L11, receiving buffers 23 (23-1 and 23-2) each connected between one of the input line interfaces 21 and an internal bus 29, sending buffers 24 (24-1 and 24-2) each connected between one of the output line interfaces 22 and the internal bus 29, and a processor 25, a program memory 26 and a data memory 27 which are connected to the internal bus 29.

The program memory 26 includes, as programs executed by the processor 25, a packet send and receive processing routine 261, an SIP server function routine 262 having an SIP protocol processing function, a registrar function routine 263, a location server function routine 264, and a basic control routine 260 for selectively starting the routines 261 to 264. In the data memory 27, an SIP information management table 271 to be referred to by the location server function routine 264 and the other data area 275 are formed.

Packets stored in the receiving buffers 23-1 and 23-2 are sequentially read out by the packet send and receive processing routine 261 and passed to the basic control routine 260. The basic control routine 260 determines the type of received packets, selectively distributes the received packets to the SIP server function routine 262, registrar function routine 263, and location server function 264, and transfers the packets processed by the routines 262-264 to the sending buffer 24-1 or 24-2 via the packet send and receive processing routine 261.

FIG. 5 shows an example of the configuration of the SIP information management table 271.

In the SIP information management table 271, a plurality of entries 2710-1, 2710-2, ... corresponding to SIP identifiers (SIP-URI) 2711 are stored. Each entry includes, at least, a terminal location information 2712, expires 2713, and a call-ID 2714 and sequence number (CSeq) 2715 used for identifying an SIP message. AS the terminal location information 2712, the home address of a mobile node is registered.

In the embodiment, the mobile node 30x is provided with the mobile IP communication function and the SIP communication function and preliminarily given an IPv6 home address (MN home address) and an SIP identifier. The mobile node 30x transmits an SIP location registration request message to the SIP server 20, thereby to register an entry indicative of correspondence between the SIP identifier and the MN home address of the mobile node 30x into the SIP information management table 271.

Figures 6, 7:
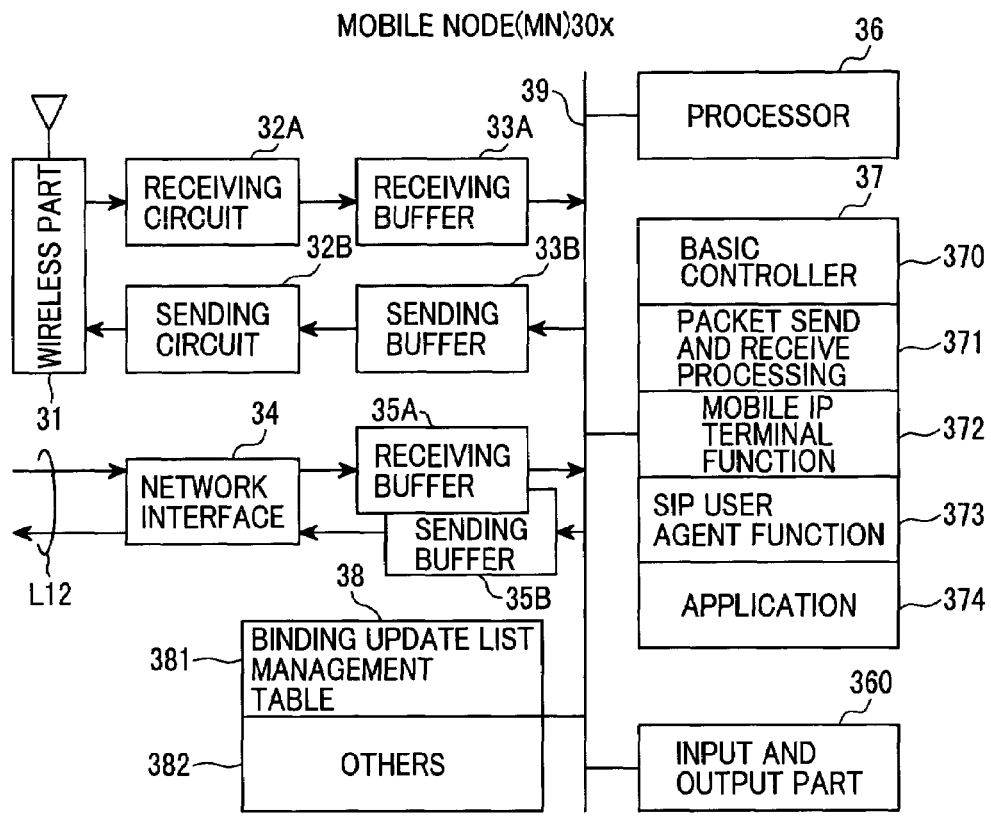
FIG. 6 is a diagram showing an example of the configuration of a mobile node (MN) 30x illustrated in FIG. 1.
FIG. 7 is a diagram showing an example of the configuration of a binding update list management table 381 of the mobile node 30x.

FIG. 6 shows an example of the configuration of the mobile node (MN) 30x.

The mobile node 30x is comprised of a wireless part 31 for sending and receiving a radio signal, a receiving circuit 32A and a sending circuit 32B connected to the wireless part 31, a receiving buffer 33A connected between the receiving circuit 32A and an internal bus 39, a sending buffer 33B connected between the sending circuit 32B and the internal bus 39, a network interface 34 for connecting to the home link L12, a receiving buffer 35A and a sending buffer 35B for the network interface, and a processor 36, a program memory 37, a data memory 38, and an input and output part 360 which are connected to the internal bus 39. The input and output part 360 includes a display, a voice input and output unit, and input keys.

The program memory 37 includes, as programs executed by the processor 36, a packet send and receive processing routine 371, a mobile IP terminal function routine 372 having a mobile IP protocol processing function, an SIP user agent function routing 373 having an SIP protocol processing function, a plurality of application routines 374, and a basic control routine 370 for selectively starting the routines.

In the data memory 38, a binding update list management table 381 to be referred to by the mobile IP terminal function routine 372 and the other data areas 382 for storing information such as MN home address, care of address CoA, and SIP identifier are formed.

Packets stored in the receiving buffers 33A and 35A are sequentially read out by the packet send and receive processing routine 371 and passed to the mobile IP terminal function routine 372 via the basic control routine 370. The mobile IP terminal function routine 372 performs a mobile IPv6 protocol processing on a received packet. A received packet which includes a mobile IP control message is processed by the routine 372. The control message generated by the mobile IP terminal function routine 372 is subjected to the mobile IPv6 protocol processing and, after that, the resultant packet is output as a mobile IP packet to the sending buffer 33A or 35B via the basic control routine 370 and the packet send and receive processing routine 371.

When a payload portion of the received packet includes an SIP control message, the received message is passed to the SIP user agent function routine 373. When the payload portion includes voice or other user data, the received data is passed to a corresponding application routine 374. The data processed by the application routine 373 is output to the input and output part 360, and the data input from the input and output unit 360 is passed to the corresponding application routine 374 via the basic control routine 370.

Transmission packet information generated by the SIP user agent function routine 373 and the application 374 is subjected to the mobile IPv6 protocol processing by the mobile IP terminal function routine 372 and, after that, the resultant is output as a mobile IP packet to the sending buffer 33A or 35B via the basic control routine 370 and the packet send and receive processing routine 371.

The application 374 and the SIP user agent function routine 373 use the home address of the mobile node 30x. Therefore, when the mobile node 30x leaves the home link and moves in the visited network 7 (7A, 7B, . . . ), an SIP message packet output from the SIP user agent function routine 373 and a data packet output from the application 374 are sent to a communication network after converted to a packet having an address system adapted to the communication in the visited network 7, by the basic control routine 370 or mobile IP terminal function routine 372.

FIG. 7 shows an example of the configuration of the binding update list management table 381.

The binding update list management table 381 is comprised of a plurality of entries 3810-1, 3810-2, . . . each corresponding to a destination address 3811 of a binding update message as a location registration request message in mobile IPv6. Each entry indicates a home address 3812 of a mobile node (MN), a care of address (CoA) 3813 obtained in a visited network by the mobile node, lifetime 3814 of a binding update list entry, sequence number 3815 for authentication of the location registration request sent from the mobile node, and the other information 3816.

Figure 8:
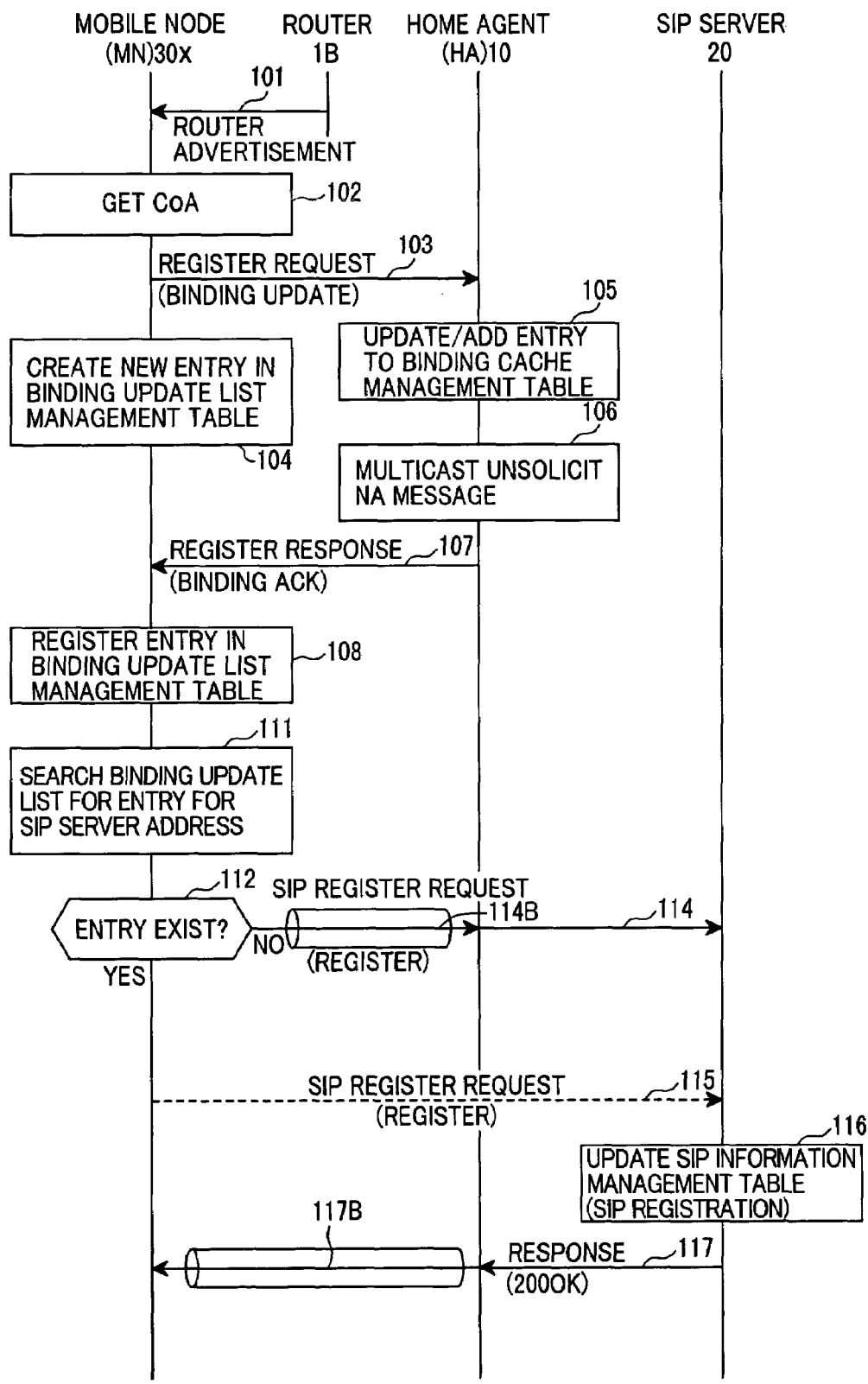
FIG. 8 is a diagram showing a sequence of registering the location of the mobile node 30x.

FIG. 8 shows a location registration sequence performed by the mobile node 30x in the visited network 7A or 7B.

Figure 9:
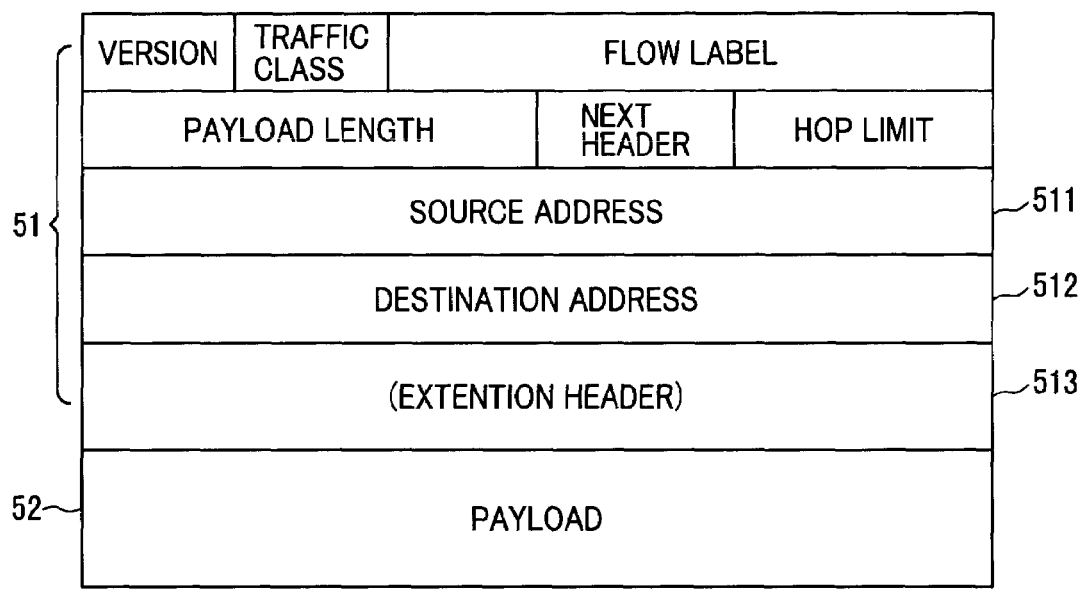
FIG. 9 is a diagram showing the format of an IPv6 packet.

For example, when the mobile node 30x moves from the visited network 7A to the visited network 7B, the mobile node 30x receives a router advertisement message from the router 1B located in the visited network 7B (101). The router advertisement message is set in a payload portion 52 of an IPv6 packet 50 shown in FIG. 9.

The IPv6 packet 50 has an IPv6 header 51 including source address 511, destination address 512, and an extension header 513. As the source address 511, the IP address of the router 1B is set. As the destination address 512, an all-nodes multicast address is set. The extension header 513 is a header portion to be used in the case of performing a mobile IP or a special packet transfer control, and all of IPv6 packets do not always have the extension header 513.

Figure 10:
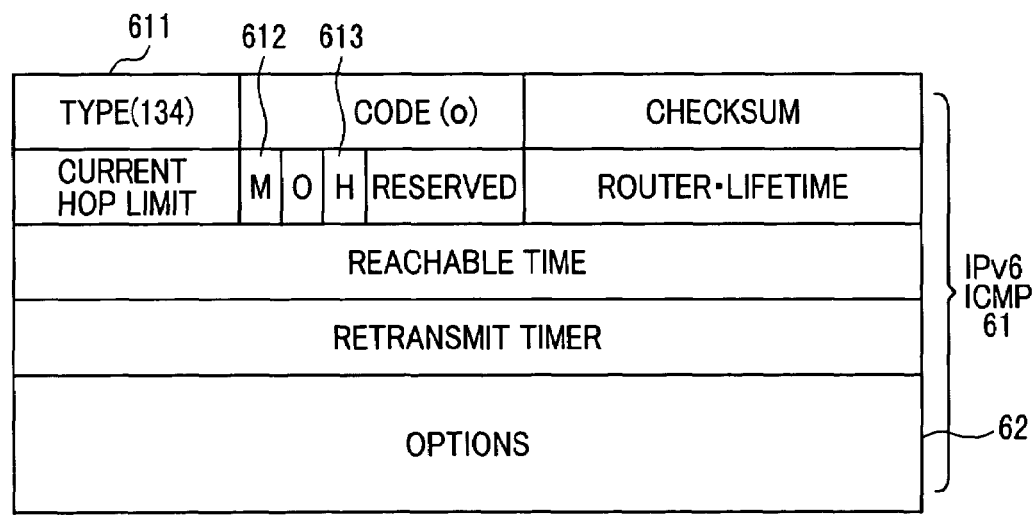
FIG. 10 is a diagram showing the format of a router advertisement message transmitted from a router.

The router advertisement message is comprised of, as shown in FIG. 10, an IPv6 ICMP portion 61. The IPv6 ICMP portion 61 includes a message type 611 indicating that the message is a router advertisement, an M bit 612, an H bit 613, and an option 62. The M bit 612 is a bit indicative of a method of obtaining CoA.

If the M bit is "1", the mobile node 30x obtains the address CoA from an address generation server not-shown in accordance with IPv6 stateful address autoconfiguration (102). If the M bit is "0", the mobile node 30x generates CoA by combining the MAC address of itself to apart (prefix part) of the router address shown by the source address 511 in accordance with IPv6 stateless address autoconfiguration. The H bit 613 indicates whether the transmission source of the message is the home agent 10 or not. As the H bit of the router advertisement message sent to the home link L12, bit value "1" indicating that the source is the home agent 10 is set.

The mobile node 30x which has obtained the CoA in the visited network 7B sends a location registration request message "binding update" 70A to the home agent 10 by the mobile IP terminal function routine 372 (103), and generates a new entry having the address of the home agent 10 as the binding update destination address 3811, as an entry to be registered in the binding update list management table 381 (104).

Figure 11:
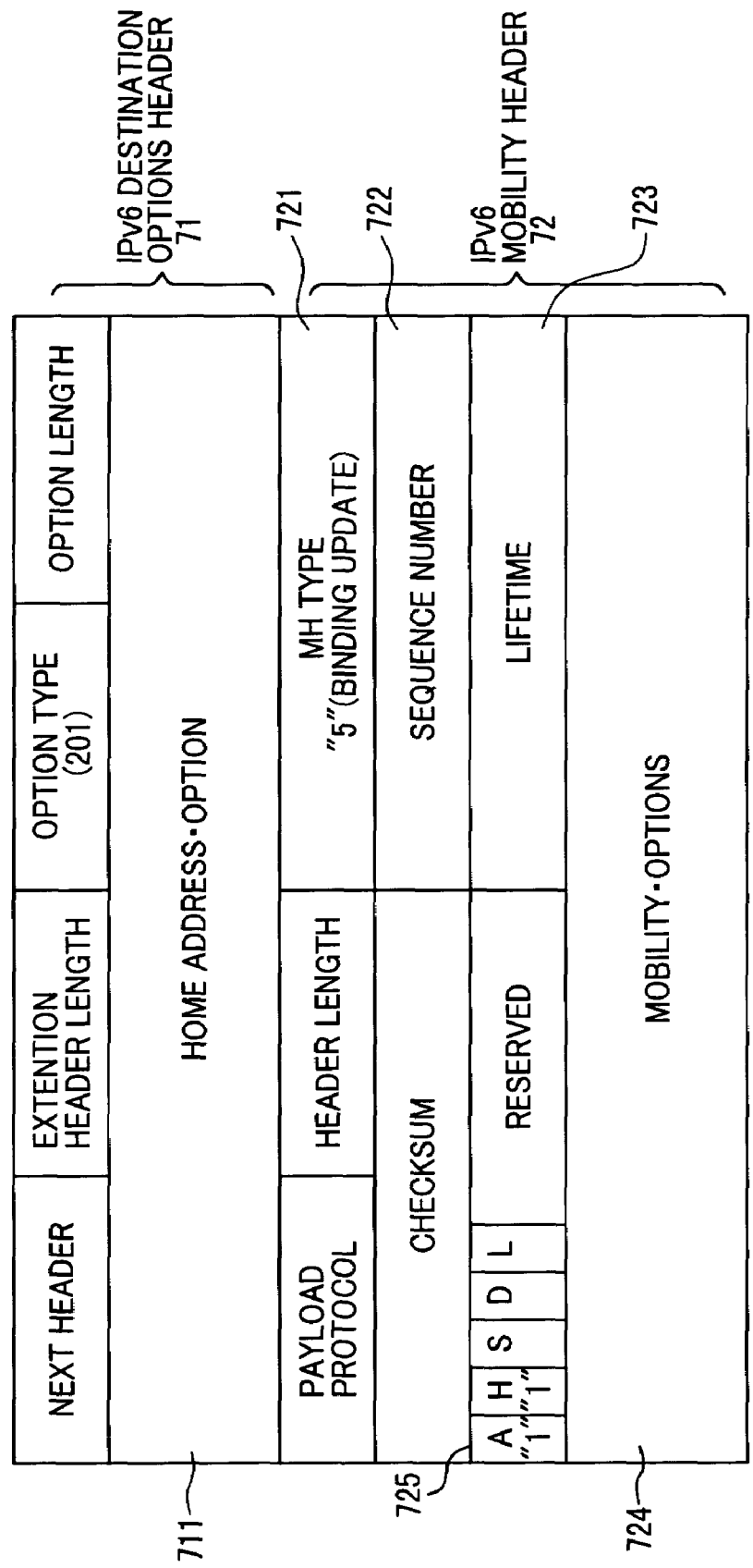
FIG. 11 is a diagram showing the format of a binding update message transmitted from the mobile node 30x.

The binding update message 70A has, as shown in FIG. 11, an IPv6 destination options header 71 and an IPv6 mobility header 72. The IPv6 destination options header 71 includes a home address option 711 in which the home address of a transmission source mobile node is set. The IPv6 mobility header 72 includes a message type field 721 in which a code indicating that the message is binding update is set, a sequence number field 722, a lifetime field 723, and mobility options 724. The header information 71 and 72 is set in the extension header 513 of the IPv6 packet shown in FIG. 9.

In the binding update message sent from the mobile node 30x to the home agent 10, the CoA obtained in the visited network by the mobile node 30x is set as the source address 511 of the IPv6 packet header 51, the home address of the mobile node 30x is set in the home address options 711, and a value larger than "0" is set in the lifetime field 723.

As the source IP address 511 of the IPv6 packer header 51, the home address of the mobile node 30x may be set. In this case, the CoA of the mobile node 30x is set in an alternate Care-of Address options field defined in the mobility options 724 of the IPv6 mobility header 72.

Upon receiving the binding update message 70A, the home agent 10 checks the message by the mobile IP home agent function routine 162 and retrieves an entry corresponding to the home address of the mobile node 30x from the binding cache management table 171. The home address of the mobile node 30x is extracted from the home address options 711 of the IPv6 destination option header of the received message.

When an entry corresponding to the home address of the mobile node 30x exists in the binding cache management table 171, the home agent 10 updates the CoA 1712 and the lifetime 1713 of the entry. If the corresponding entry does not exist, a new entry for the mobile node 30x including the CoA value extracted from the binding update message 70Aa is added to the binding cache management table 171 (105).

The home agent 10 operates as a proxy of the mobile node 30x. In this case, the home agent 10 multicasts an unsolicit NA message to neighboring nodes (106) and sends to the mobile node 30x a response message (BINDING ACK) 70B for the binding update message 70A (107).

Figure 12:
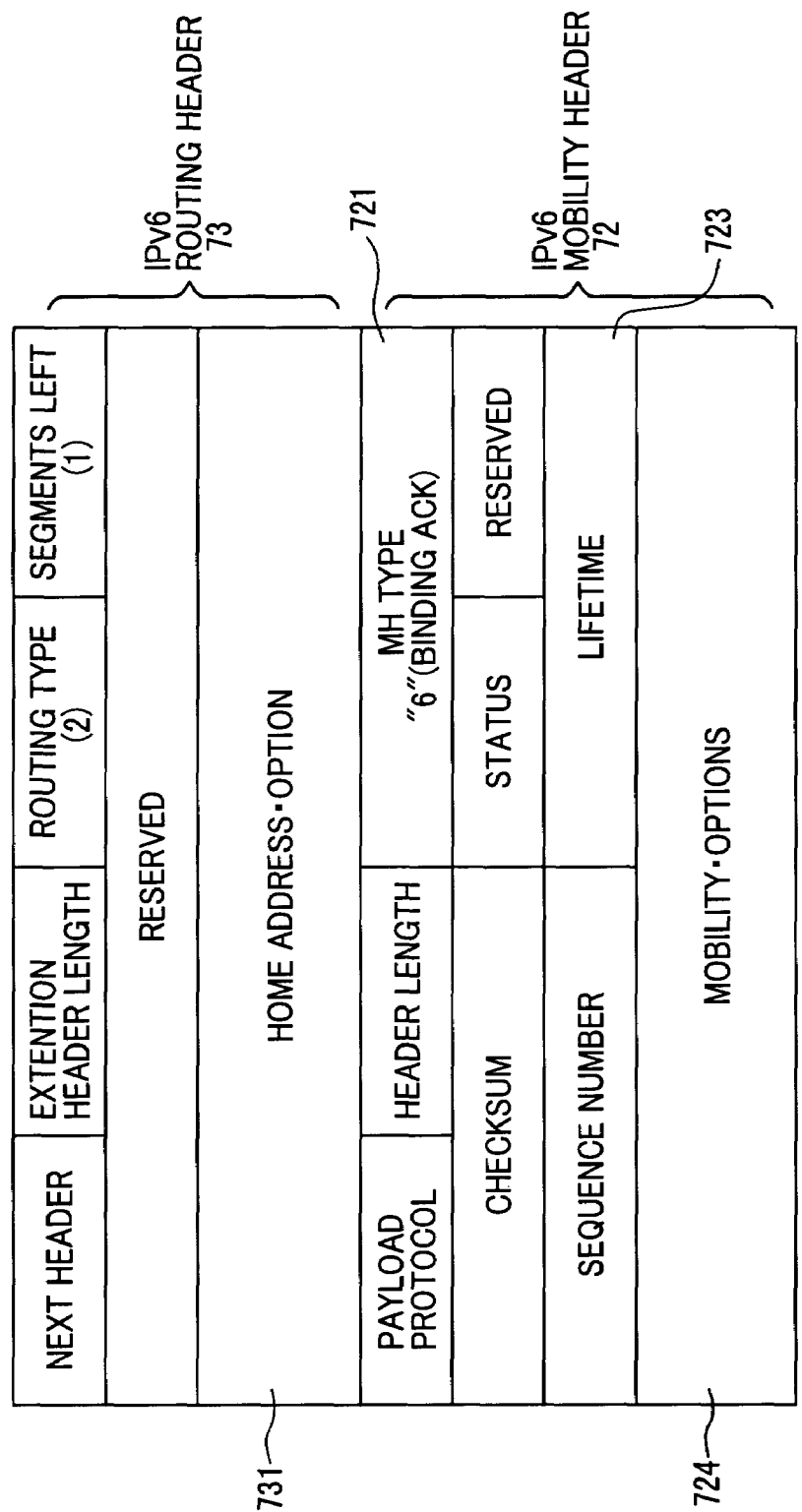
FIG. 12 is a diagram showing the format of a binding acknowledgment message transmitted from the home agent 10.

FIG. 12 shows the format of the binding ACK message 70B.

The binding ACK message 70B has an IPv6 routing header 73 and the IPv6 mobility header 72. In the message type field 721 of the IPv6 mobility header 72, a code indicating that the message is binding ACK is set. The header information 73 and 72 is set in the extension header 513 of the IPv6 packet shown in FIG. 9.

The binding ACK message 70B sent out from the home agent 10 to the mobile node 30x includes the IP address of the home agent 10 as the source address 511 and the value of the source address 511 of the binding update message 70A as the destination address 512 of the IPv6 packet header 50. When a value other than the home address of the mobile node 30x is set as the destination address 512, the home address of the mobile node 30x is set in a home address field 731 of the IPv6 routing header 73.

When the binding ACK message 70B is received, the mobile node 30x registers a new entry already prepared in step 104 into the binding update list management table 381 by the mobile IP terminal function routine 372 (108). After that, a terminal location registering sequence to the SIP server 20 is started by the SIP user agent function routine 373.

In the terminal location registering sequence, the mobile node 30x retrieves an entry corresponding to the SIP server 20 from the binding update list management table 381 (111). When an entry corresponding to the SIP server 20 is not registered in the binding update list management table 381, the mobile node 30x transmits an SIP location registration request message (REGISTER) 80A to the SIP server 20 via the home agent 10.

An original IP packet including the register message 80A is sent to the home agent 10 in a form encapsulated with the IPv6 header having the destination address 512 of the home agent (114B). The home agent 10 removes the IPv6 capsulation header from the received packet (decapsulation) and transfers the original IP packet to the SIP server 20 (114).

In the case where an entry corresponding to the SIP server 20 has been registered in the binding update list management table 381, the mobile node 30x sends the SIP location registration request message (REGISTER) 80A directly to the SIP server 20 (115)

Figure 13:
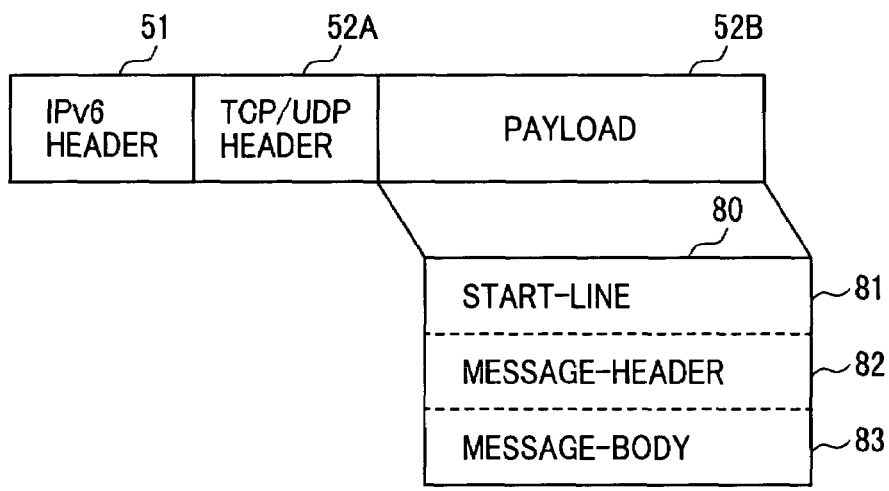
FIG. 13 is a diagram showing an SIP message protocol stack.

FIG. 13 shows the format of an IP packet including a protocol stack of an SIP message. An IP packet including an SIP message is comprised of an IPv6 header 51, a TCP/UDP header 52A, and a payload 52B, and the SIP message is set in the payload 52B.

The SIP message is constructed by a start-line 81 indicative of the type of the SIP message and the address, a message-header 82 indicative of SIP parameters, and a message-body 83 indicative of information of a connection logically established between terminals.

Figure 14:
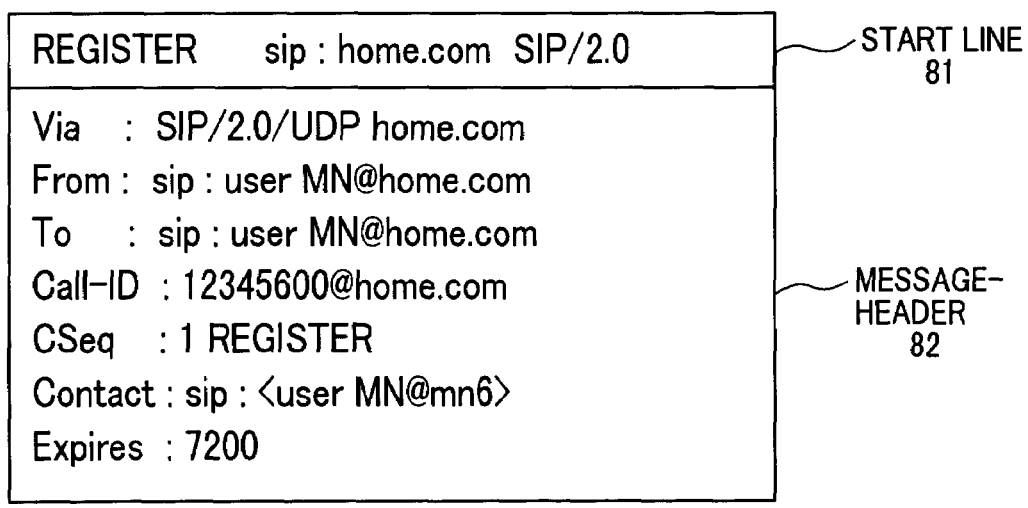
FIG. 14 is a diagram showing an example of an SIP "REGISTER" message sent by the mobile node 30x.

FIG. 14 shows an example of the SIP location registration request message (REGISTER) 80A sent from the mobile node 30x to the SIP server 20.

In the start-line 81 of the REGISTER message 80A, "REGISTER" indicative of the type of the message (method name) and domain name of the SIP server 20 to execute a registering process are set. In the message-header 82, the value of SIP-URI of the mobile node 30x, for example, "userMN@home.com" is set in a "To" header as an SIP identifier indicative of an entry to be updated in the SIP information management table 271,. In this case, the same SIP-URI value as that in the "To" header is also set in a "From" header. In "Contact" header, the value of the terminal location information 2712 to be registered in the SIP information management table 271, for example, the home address "userMN@mn6" of the mobile node 30x is set.

Referring again to FIG. 8, upon receiving the SIP location registration request message (REGISTER), the SIP server 20 registers a new entry 2710-n into the SIP information management table 271 (116). The new entry 2710-n indicates the values of the terminal location information 2712 corresponding to SIP-URI ("userMN@home.com") of the mobile node 30x, expires 2713, and identification information of the REGISTER message (Call-ID 2714 and sequence number 2715).

In this case, as the terminal location information 2712, the home address ("userMN@mn6") of the mobile node 30x is set. As the expires 2713, Call-ID 2714, and sequence number 2715, values of Expiers, Call-ID and Cseq extracted from the message-header 82 of the REGISTER message 80A are set, respectively.

When the registration of the new entry to the SIP information management table 271 is completed, the SIP server 20 sends a response message ("200 OK") for the SIP location registration request to the mobile node 30x (117). In the case where the SIP location registration request message 80A is transferred via the home agent 10, the response message is transferred to the mobile node 30x via the home agent 10. In this case, an IP packet including the response message sent from the SIP server 20 is transferred to the mobile node 30x after encapsulating with an IP header indicating CoA as the destination address by the home agent 10 (117B).

Location registration to the home agent 10 and location registration to the SIP server 20 described above are repeated in predetermined cycles in order to update the expires of the binding cache management table 381 and the SIP information management table 271 even in the case where the mobile node 30x remains in the same visited network. The cycle of location registration to the home agent 10 and the cycle of location registration to the SIP server 20 do not always coincide with each other.

A data packet communication procedure using the session establishing function according to the SIP executed between the mobile node 30x and the correspondent terminal (CN) 40 after completion of registration of the terminal location to the home agent 10 and the SIP server 20 will now be described.

Figure 15:
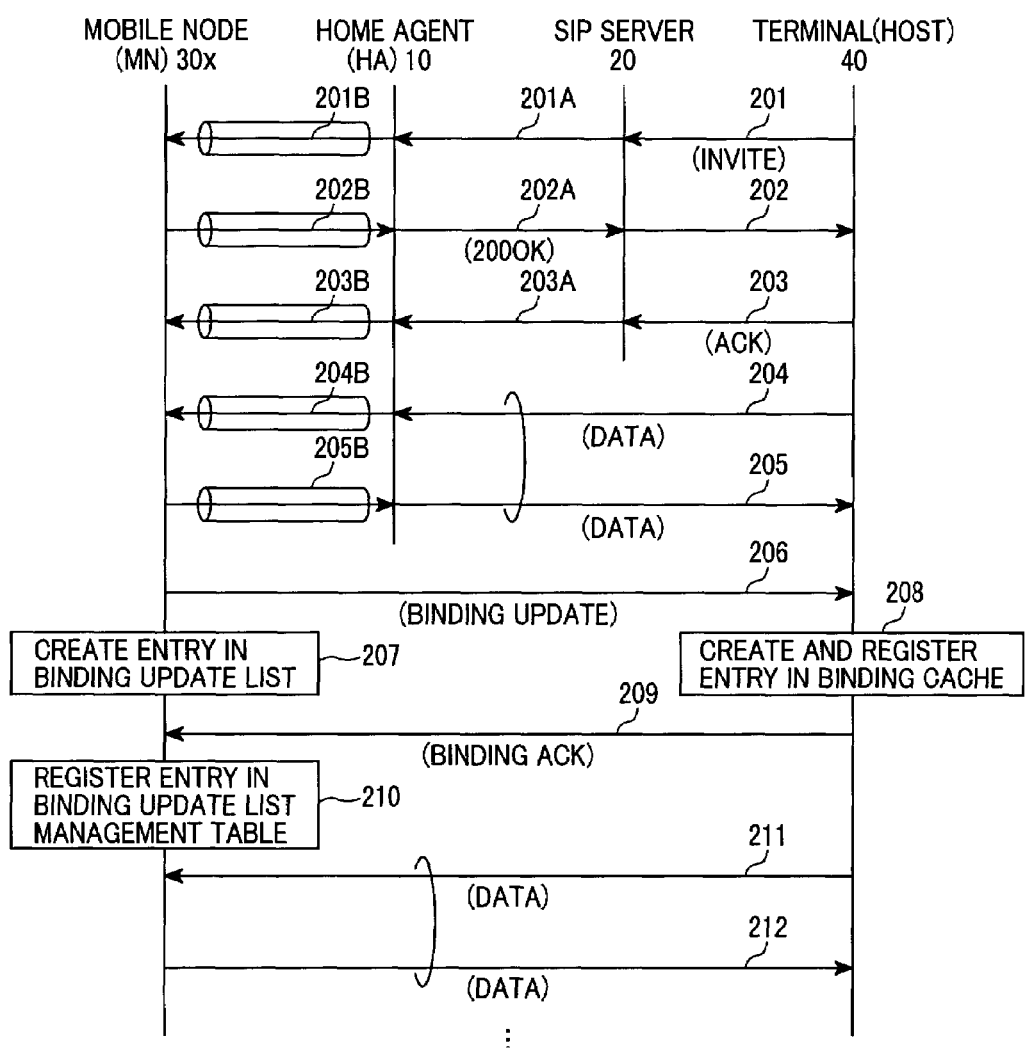
FIG. 15 is a diagram showing a communication procedure, which seems to be common, using an SIP session establishing function.

FIG. 15 shows the data communication procedure in the case of simply applying the session establishing function according to the SIP to the mobile node 30x. It is assumed here that the address of the SIP server 20 is already given as a destination of the SIP message in the terminal 40.

The terminal 40 sends an IP packet including an SIP message (INVITE) 80B to the SIP server 20 prior to transmission of data packets to the mobile node 30x (201).

The INVITE message 80B sent from the terminal 40 includes in the start-line 81, for example as shown in FIG. 16, "INVITE" as the message type (method name) and SIP URI "userMN@home.com" of the mobile node 30x as destination information of the SIP message. The message-header 82 includes information "SIP/2.0/UDP cn6" of the terminal 40 which processed the request in "Via" header, SIP URI "userMN@home.com" of the mobile node 30 in "To" header, and SIP URI "userCN@home.com" of the terminal 40 and tag information in "From" header. In the message-body 83, a reception address "cn6" of data packets in the terminal 40 is set as "c=".

Upon receiving the IP packet including the SIP message (INVITE), the SIP server 20 retrieves an entry corresponding to SIP-URI indicated in the start-line 81 of the received message from the SIP information management table 271 by the SIP server function routine 262, and transfers the SIP message (INVITE) packet to the home address of the mobile node 30x indicated by the terminal location information 2712 of the retrieved entry (201A). As the source address of the IP packet, the address of the SIP server 20 is set.

The home agent 10 intercepts the SIP message packet and transfers the SIP message packet as an encapsulated IP packet to the network 5 by adding an IPv6 header including CoA of the mobile node 30x as a destination address to the received packet (201B). As the source address of the encapsulation header, the IP address of a home agent HA1 is set.

On receipt of the SIP message (INVITE) packet, the mobile node 30x starts the SIP user agent function routine 373 to generate an IP packet including the SIP response message ("200 OK") addressed to the SIP server 20. The IP packet is sent to the home agent 10 as an encapsulated IP packet with an IPv6 header including the address of the home agent 10 as a destination address (202B). The home agent 10 removes the encapsulation header from the response message packet to obtain the original IP packet addressed to the SIP server 20, and transfers the original IP packet to the SIP server 20 (202A). The SIP server 20 rewrites the destination address and transfers the resultant packet to the terminal 40 (202).

When the SIP response message is received, the terminal 40 sends an IP packet including an SIP response acknowledge message (ACK) to the SIP server 20 (203). The response acknowledge message (ACK) is transferred to the mobile node 30x in a procedure similar to the procedure (203A and 203B) of the SIP message (INVITE).

When the mobile node 30x receives the SIP response acknowledge message (ACK) packet, a logical session between the terminal 40 and the mobile node 30x is established, and data packet communication between the terminal 40 and the mobile node 30x via the home agent 10 is enabled.

When the terminal 40 transmits a data packet to the mobile node 30x, the terminal 40 searches its binding cache management table on the basis of the home address of the mobile node 30x. In the case where an entry for the mobile node 30x is not registered yet in the binding cache management table, the terminal 40 generates an IP packet (DATA) whose destination address is the home address of the mobile node 30x, and transmits the IP packet to the network 5 (204).

The IP packet is intercepted by the home agent 10 and transferred to the mobile node 30x as an encapsulated IP packet with an IP header including CoA of the mobile node 30x as a destination address (204B).

On the other hand, in the case of sending data from the mobile node 30x to the terminal 40, the mobile node 30x retrieves an entry having a binding update destination address 3811 coincides with the IP address of the terminal 40 from the binding update list management table 381. If an entry for the terminal 40 is not registered yet in the table, the mobile node 30x sends the IP packet (DATA) for the terminal 40 as an encapsulated IP packet with an IP header including the address of the home agent 10 as a destination address (205B). The encapsulated IP packet is decapsulated by the home agent 10 to the original IP packet having the address of the terminal 40 as a destination address, and the original IP packet is transferred to the terminal 40 (205).

When the IP packet (DATA) from the terminal 40 is received, since the IP address of the terminal 40 included as the source address in the IP header of the received packet is known, the mobile node 30x can optimize the communication route to the terminal 40 by using the IP address. Therefore, the mobile node 30x starts the mobile IP terminal function routine 372, sends a binding update message 70A as a mobile IPv6 location registration request message to the terminal 40 (206), and generates an entry for the binding update list management table having the IP address of the terminal 40 as the binding update destination address 3811 (207).

Upon receiving the binding update message 70A, the terminal 40 generates an entry for the binding cache management table indicative of the correspondence between the home address and CoA of the mobile nod 30x, and registers the entry in its binding cache management table (208). The terminal 40 checks an A bit 725 included in the IPv6 mobility header 72 of the binding update message 70A. When bit value "1" is set in the A bit, the terminal 40 generates an IP packet including a response message (BINDING ACK) for the binding update message and transmits the IP packet to the mobile node 30x (209).

When the response message (binding ACK) packet is received, the mobile node 30x registers the entry generated in step 207 into the binding update list management table 381 (210).

By registering the entry for the mobile node 30x in the binding cache management table, the terminal 40 can send data packets (DATA) generated thereafter and addressed to the mobile node directly to the mobile node 30x without passing though the home agent 10 (211). On the other hand, since the entry for the terminal 40 has been registered in the binding update list management table 381, the mobile node 30x can also send data packets (DATA) generated thereafter and addressed to the terminal 40 directly to the terminal 40 (212).

According to the communication procedure, until the optimization of the mobile IP communication route is completed, data packets communicated between the mobile node 30x and the terminal 40 always passes through the home agent 10. In this case, all the packets are communicated between the home agent 10 and the mobile node 30x in a form of the encapsulated IP packet obtained by adding the IPv6 header to the original packets. It consequently causes a problem such that not only the load of packet relay processing increases but also a use communication bandwidth increases due to the increase in the packet length.

One of the features of the invention is to optimize the communication route between the mobile node 30x and the terminal 40 before the start of data packet transfer.

Figure 17:
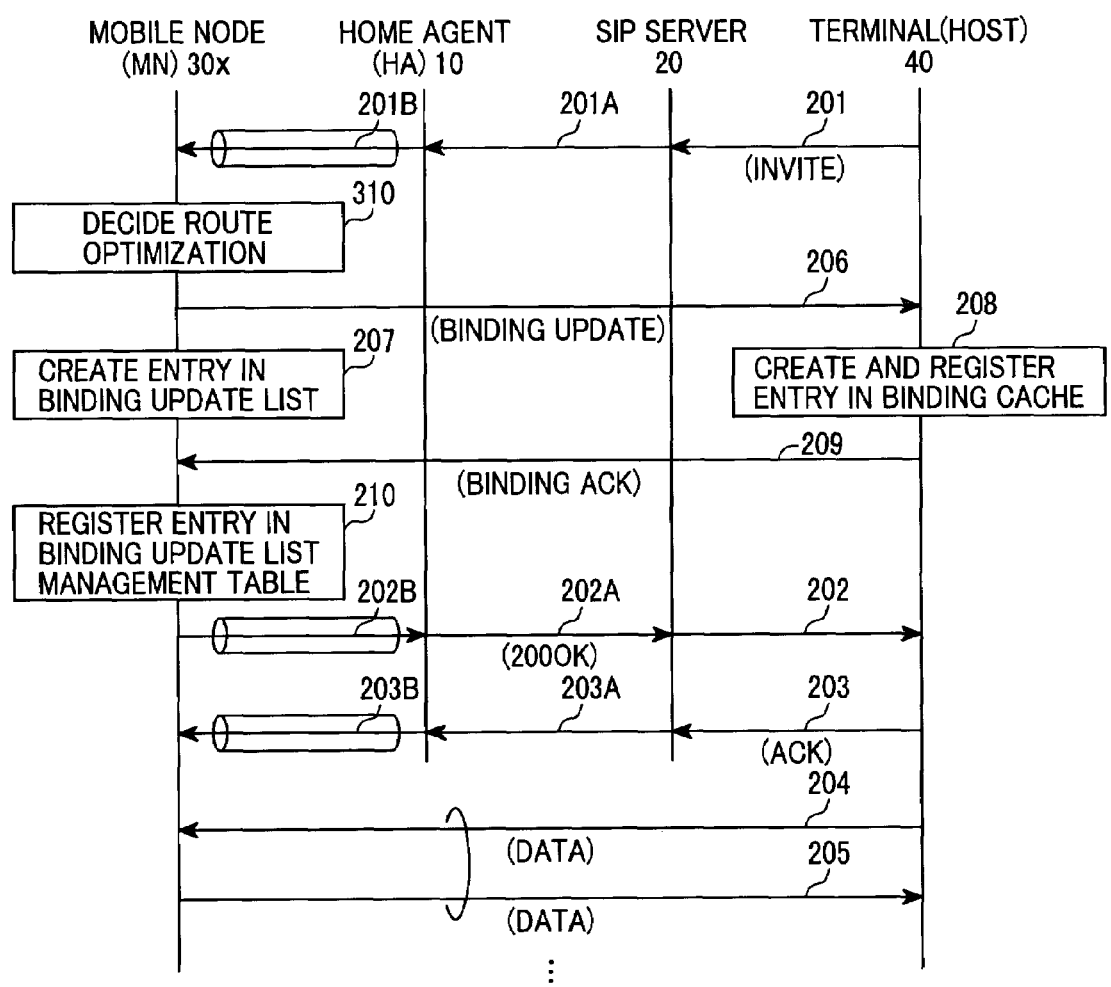
FIG. 17 is a diagram showing a first embodiment of a communication procedure according to the invention, using the SIP session establishing function.

FIG. 17 shows a first embodiment of the data communication procedure according to the invention using the session establishing function of the SIP.

In the example, when an encapsulated IP packet including the SIP message (INVITE) 80B is received from the home agent 10, in the SIP user agent function routine 373 of the mobile node 30x determines on the basis of the received SIP message, whether the communication route to the terminal 40 as the transmitter of the SIP message should be optimized and whether the optimization of the communication route is possible (310). If the route optimization is possible, the mobile node 30x sends an IPv6 location registration request message (binding update) 70A to the terminal 40 (206), and generates an entry for the terminal 40 to be registered in the binding update list management table (207).

As described by referring to FIG. 15, when the binding update message 70A is received, the terminal 40 registers an entry for the mobile node 30x into the binding cache management table (208) and sends to the mobile node 30x an IP packet including the response message (binding ACK) for the biding update request (209). When the response message (binding ACK) is received, the mobile node 30x registers the entry generated in step 207 into the binding update list management table 381 (210), thereby completing the optimization of the communication route.

One of the features of the embodiment resides in that, the mobile node 30x sends the SIP response message (200 OK) for the SIP message (INVITE) 80B (202B) after completion of the optimization of the communication route. Transfer of the SIP response message to the terminal 40 and transfer of the SIP response acknowledge message (ACK) from the terminal 40 to the mobile node 30x are carried out according to a procedure similar to that of FIG. 15. An IP packet including the SIP response acknowledge message (ACK) can be sent from the terminal 40 directly to the mobile node 30x without being passed through the home agent 10.

When the mobile node 30x receives the SIP response acknowledge message (ACK) packet, a logical session between the terminal 40 and the mobile node 30x is established. According to the embodiment, since the optimum route is already set between the terminal 40 and the mobile node 30x, it is able to transfer all of data packets via the optimum route without passing through the home agent 10.

That is, by registering the entry for the mobile node 30x into the binding cache management table, the terminal 40 can obtain CoA corresponding to the home address of the mobile node 30x from the binding cache management table. Accordingly, by setting the address of the terminal 40 as the source address 511 of the IPv6 data packet, CoA of the mobile node 30x as the destination address 512, and the home address of the mobile node 30x as the routing header 73 included in the extension header 513, the terminal 40 can directly send the data packets (DATA) to the mobile node 30x without passing the data packet through the home agent 10 (204).

Similarly, by registering the entry for the terminal 40 into the binding update list management table 381, the mobile node 30x is also able to send the data packet (DATA) destined to the terminal 40 directly to the terminal 40 (205). In this case, the mobile node 30x sets the IP address of the terminal 40 as the destination address 512 of the IPv6 transmission packet, own CoA as the source address 511, and own home address in the home address option 711 of the destination options header 71 included in the extension header 513.

Figure 18:
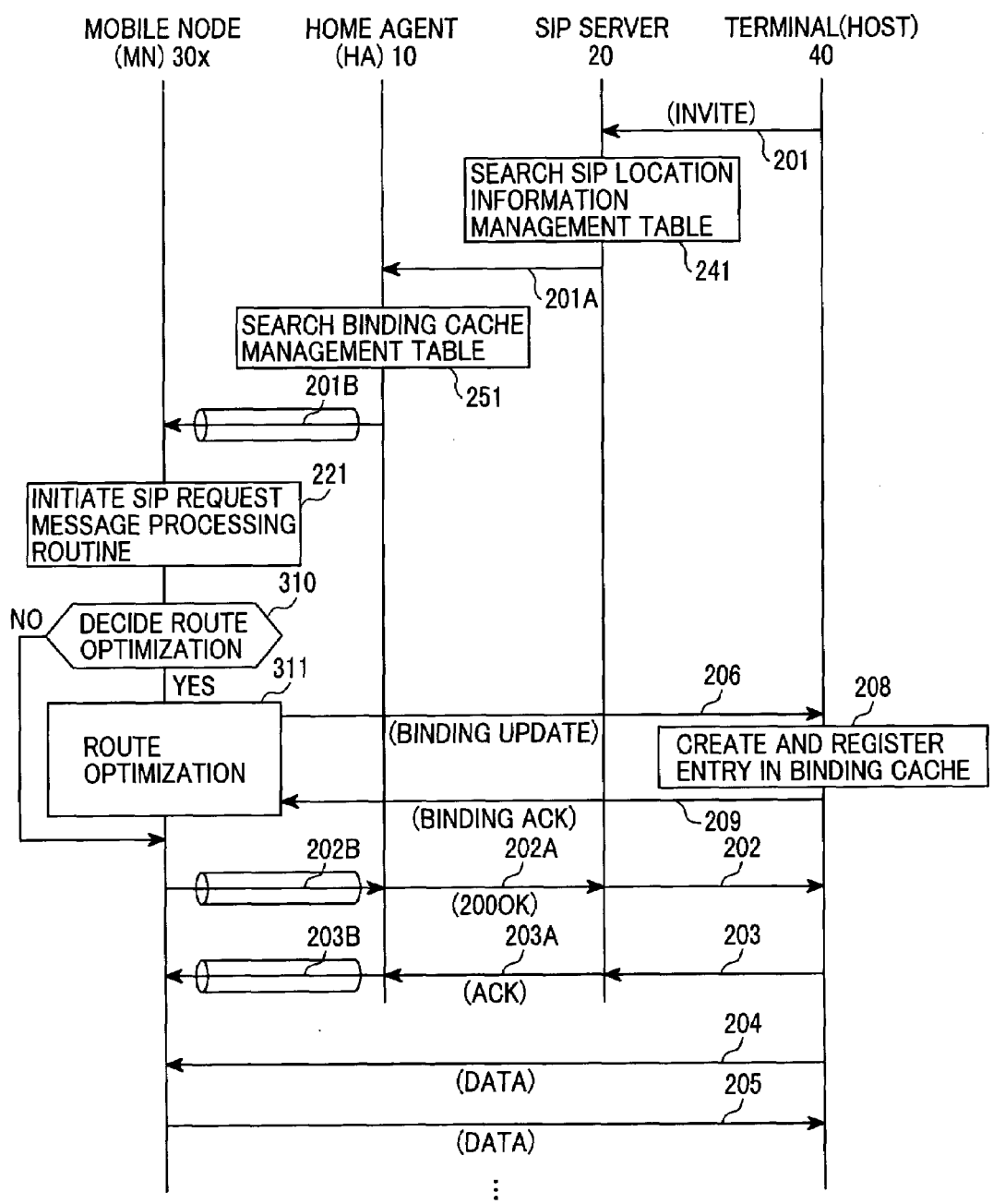
FIG. 18 is a diagram showing a detailed procedure of the communication procedure of FIG. 17.

FIG. 18 is a diagram showing the details of the data communication procedure illustrated in FIG. 17.

The SIP server 20 having received the IP packet including the SIP message (INVITE) from the terminal 40 retrieves an entry corresponding to SIP-URI indicated by the received message from the SIP information management table 271 by the SIP server function routine 262 (241), and transfers the received packet to the home address of the mobile node 30x indicated by the entry (201A).

When the home agent 10 intercepts the IP packet, the mobile IP home agent function routine 162 retrieves an entry corresponding to the home address of the mobile node 30x indicated by the destination address of the received packet from the binding cache management table 171 (251), and transfers the received packet to the mobile node 30x as an encapsulated IP packet with an IPv6 header applying CoA in the entry as destination address (201B).

Figure 19:
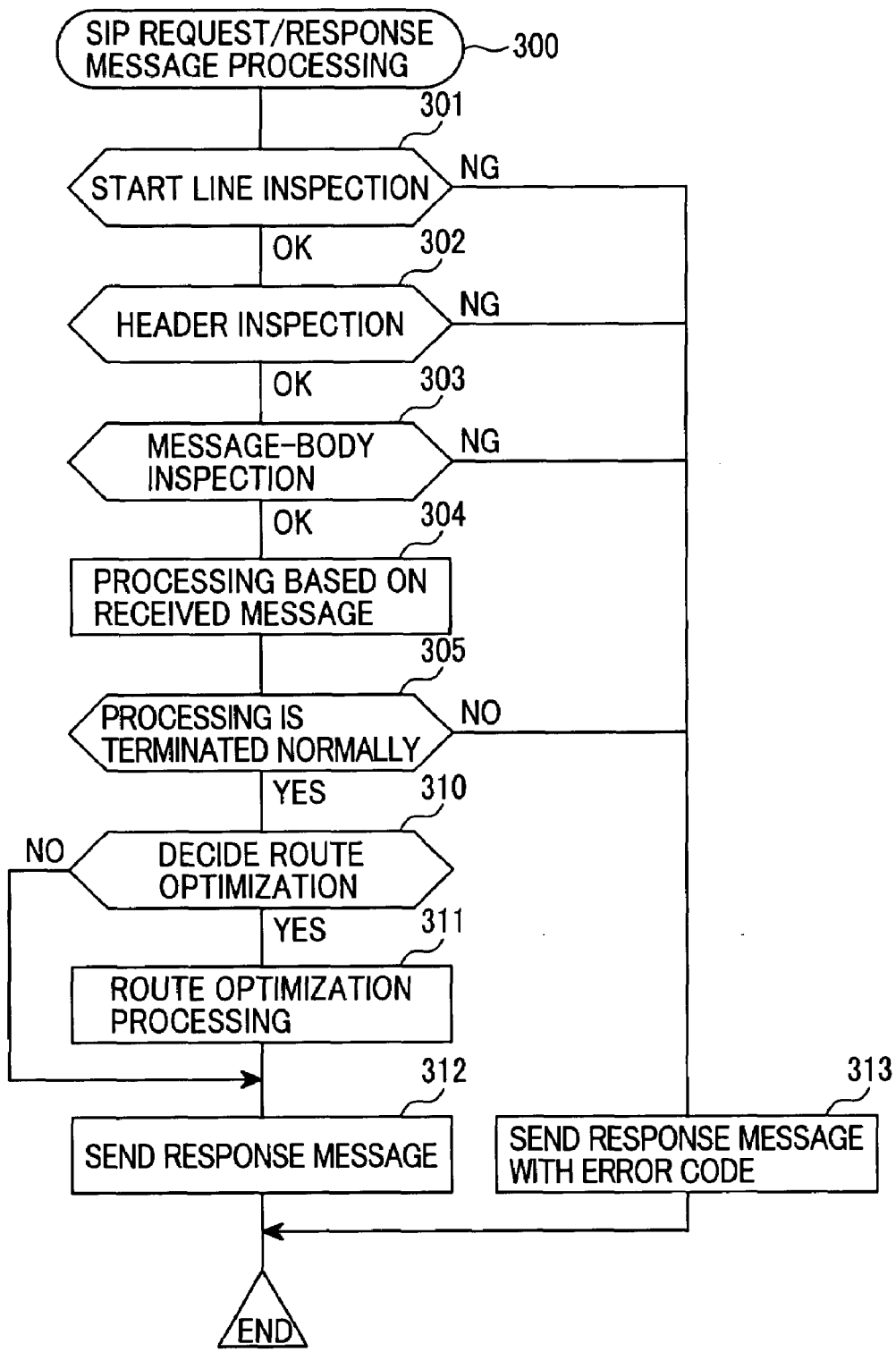
FIG. 19 is a flowchart of an SIP request/response message processing routine 300 executed by the mobile node 30x.

When the mobile node 30x receives the encapsulated IP packet from the home agent 10, if the received packet includes the SIP request message (INVITE) or SIP response message (200 OK), the SIP user agent function routine 373 executes an SIP request/response message processing routine 300 shown in FIG. 19 (221).

The SIP request/response message processing routine 300 checks the contents of the start-line 81 of the received SIP message (301). If the mobile node 30x supports the method (for example, "INVITE") or code (for example, "200" indicative of OK response) shown in the start-line 81, whether the SIP message is to be received or not is determined on the basis of request-URI written in the start-line 81 and the contents of the header included in the message-header 82 (302).

In the case where the SIP message is received, whether the message-body 83 is interpretable or not is determined on the basis of the contents of the content-type header included in the message-header 82 (303). If the message-body 83 is interpretable, a process corresponding to the received message is carried out (304). That is, if the received message is the SIP request message (INVITE), for example, the SIP response message (200 OK) is generated as a response message. If the received message is the SIP response message (200 OK), the SIP response acknowledge message (ACK) is generated as a response message.

When the process of step 304 is normally completed (305), whether route optimization is necessary or not is determined (310). If the entry for the terminal 40 is already registered in the binding update list management table 381, route optimization is unnecessary. If connection information is not set in the message-body 83, execution of the route optimization is omitted.

As shown by the content-type header in the INVITE message 80B in FIG. 16, when the application applied to the message-body is SDP, connection information is written in "c=". In the case where an entry for the terminal 40 is not registered yet in the binding update list management table 381 and connection information is set in the message-body 83, a process of optimizing the mobile IP communication route to an IPv6 address ("cn6" in this example) indicated by the connection information is requested (311) to the mobile IP terminal function routine 372.

The mobile IP terminal function routine 372 transmits (206) a request signal (binding update) of optimizing the mobile IP communication route to the terminal 40 as shown in FIG. 17, and generates (207) a new entry for the terminal 40 to be registered in the binding update list management table 381. The entry is registered (210) in the binding update list management table 381 when the response message (binding ACK) is received (209) from the terminal 40.

On completion of the process of optimizing the communication route (311) by the mobile IP terminal function routine 372, the SIP request/response message processing routine 300 transmits (312) a response message ("200 OK" or "ACK") for the SIP message generated in step 304, and terminates the SIP request/response message processing routine 300.

In the case where connection information is not set in the message-body 83 of the received SIP message, the response message for the received SIP message (INVITE) is sent (312) without executing the communication route optimizing process, and the routine 300 is terminated. If the determination result is "NO" in any of the steps 301 to 303 and 305, an error response message for the SIP message is sent (313), and the routine 300 is terminated.

Figure 20:
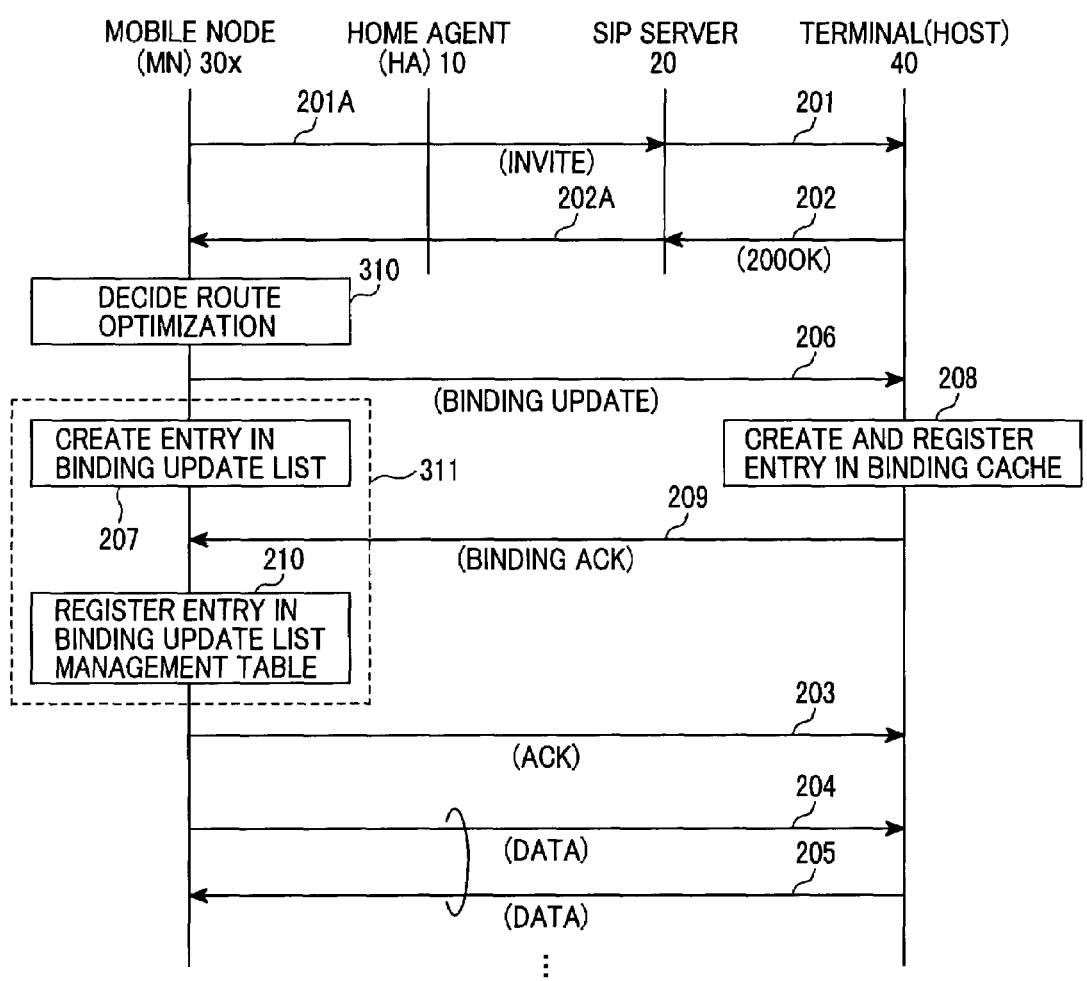
FIG. 20 is a diagram showing an example of a communication procedure according to the invention in the case of transmitting a data packet to a mobile node or terminal.

FIG. 20 shows a data communication procedure according to the invention in the case of sending a data packet from the mobile node 30x to the terminal 40.

An IPv6 packet including the SIP request message (INVITE) is sent (201A) from the mobile node 30x to the SIP server 20 and transferred (201) from the SIP server 20 to the terminal 40. In response to the reception of the SIP request message (INVITE), the terminal 40 sends (202) an IP packet including the SIP response message (200 OK) to the SIP server 20. The SIP response message packet is transferred (202A) from the SIP server 20 to the mobile node 30x.

In the embodiment, the mobile node makes route optimization decision on receipt of the SIP response message packet (310). In this case as well, the SIP request/response message processing routine 300 shown in FIG. 19 is carried out. If route optimization is necessary and connection information necessary to the route optimization is set in the SIP response message, the communication route between the mobile node 30x and the terminal 40 is optimized (311) by the mobile IP terminal function routine 372. In the case of the embodiment, in step 304 of the SIP request/response message processing routine 300, the SIP response acknowledge message (ACK) is generated. On completion of the communication route optimization, the SIP response acknowledge message (ACK) is sent (203 and 312) to the terminal 40.

When the mobile node 30x sends the session control message (INVITE) to another mobile node having the same function such as the mobile node 30a, the communication route optimization is started on the mobile node 30a side which received the control message. In this case, when the binding update message is received from the correspondent node 30a, the mobile node 30x registers an entry for the terminal 30a into its binding cache management table and returns the binding ACK. When the SIP response message (200 OK) is received from the correspondent node 30a, the mobile node 30x determines that route optimization is necessary in step 310 and notifies the correspondent node 30a of binding information of the mobile node 30x. After that, the SIP response acknowledge message (ACK) is returned from the mobile node 30x to the mobile node 30a.

According to the embodiment, the mobile node 30x executes the mobile IP communication route optimization in response to the reception of the SIP session control message such as "INVITE" or "200 OK" and establishes an optimum communication route to the terminal 40. Thus, communication on the optimum route is possible when the first data packet is communicated between the mobile node 30x and the terminal 40. Particularly, when VOIP communication is performed between the mobile node 30x and the terminal 40, it is able to reduce the load and transfer delay caused by the capsulation processing and decapsulation processing of voice packets and to avoid the fluctuation in the communication quality caused by the switching from a communication route via the home agent to the optimum route during data packet communication.

Figure 21:
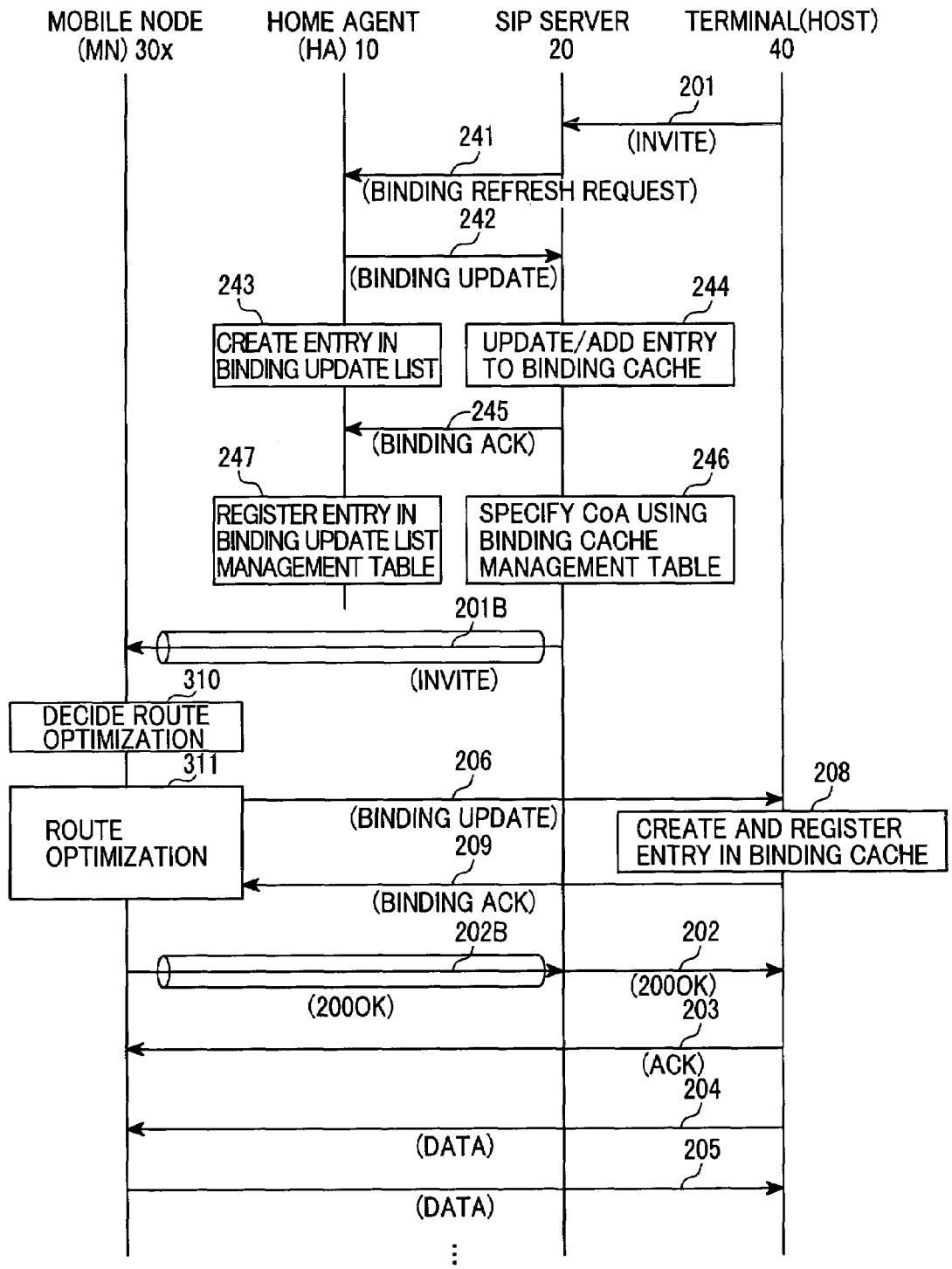
FIG. 21 is a diagram showing a second embodiment of the communication procedure according to the invention using the SIP session establishing function.

FIG. 21 shows a second embodiment of the data communication procedure according to the invention.

The second embodiment is characterized in that, in addition to the optimization (220 to 311) of the communication route to the terminal 40 performed by the mobile node 30x in response to reception of the SIP message from the terminal 40, the SIP server 20 optimizes an SIP message communication route to the mobile node 30x. Specifically, in the example, when an SIP message is received (201) from the terminal 40, the SIP server 20 and the home agent 10 execute the procedures 241 to 247, so that the SIP request message (INVITE) and the SIP response message (200 OK) which are passed through the home agent 10 in the first example are directly communicated (201B and 202B) between the SIP server 20 and the mobile node 30x.

Figure 22:
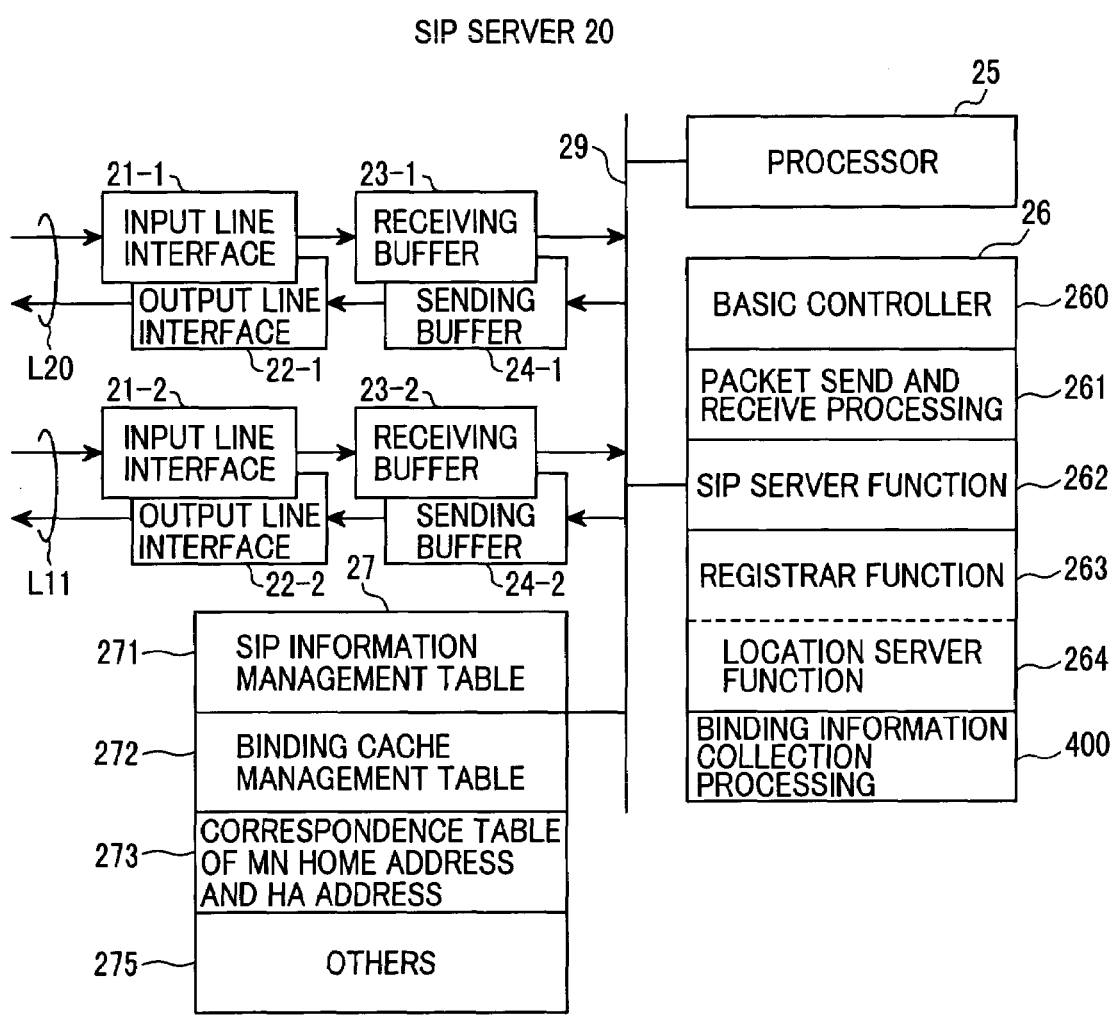
FIG. 22 is a diagram showing the configuration of an SIP server 20 in the second example.

In the example, as shown in FIG. 22, the SIP server 20 is provided with a binding information collecting processing routine 400 for route optimization in the program memory 26, in addition to the basic control routine 260, packet send and receive processing routine 261, SIP server function routine 262, registrar function routine 263 and server function routine 264. The SIP server 20 is also provided with a binding cache management table 272 and a correspondence table 273 of MN home address and HA address in the data memory 27 to be referred to by the binding information collection processing routine 400.

Figures 23, 24:
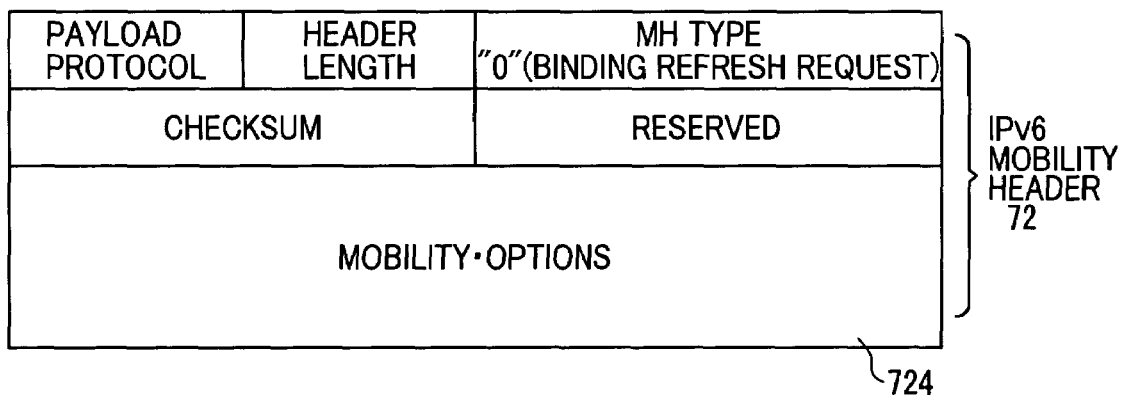
FIG. 23 is a diagram showing the configuration of a correspondence table 273 of MN home address and HA address which is provided in the SIP server.
FIG. 24 is a diagram showing a binding refresh request message.

In the binding cache management table 272, entries each having information similar to that in the binding cache management table 171 shown in FIG. 3 of the home agent 10 are stored. In the correspondence table 273 of MN home address and HA address, as shown in FIG. 23, entries 2730-1, 2730-2, . . . each indicating a correspondence between the home address (MN home address) of a mobile node and the address (HA address) of the home agent to which the mobile node belongs are registered.

Figure 25:
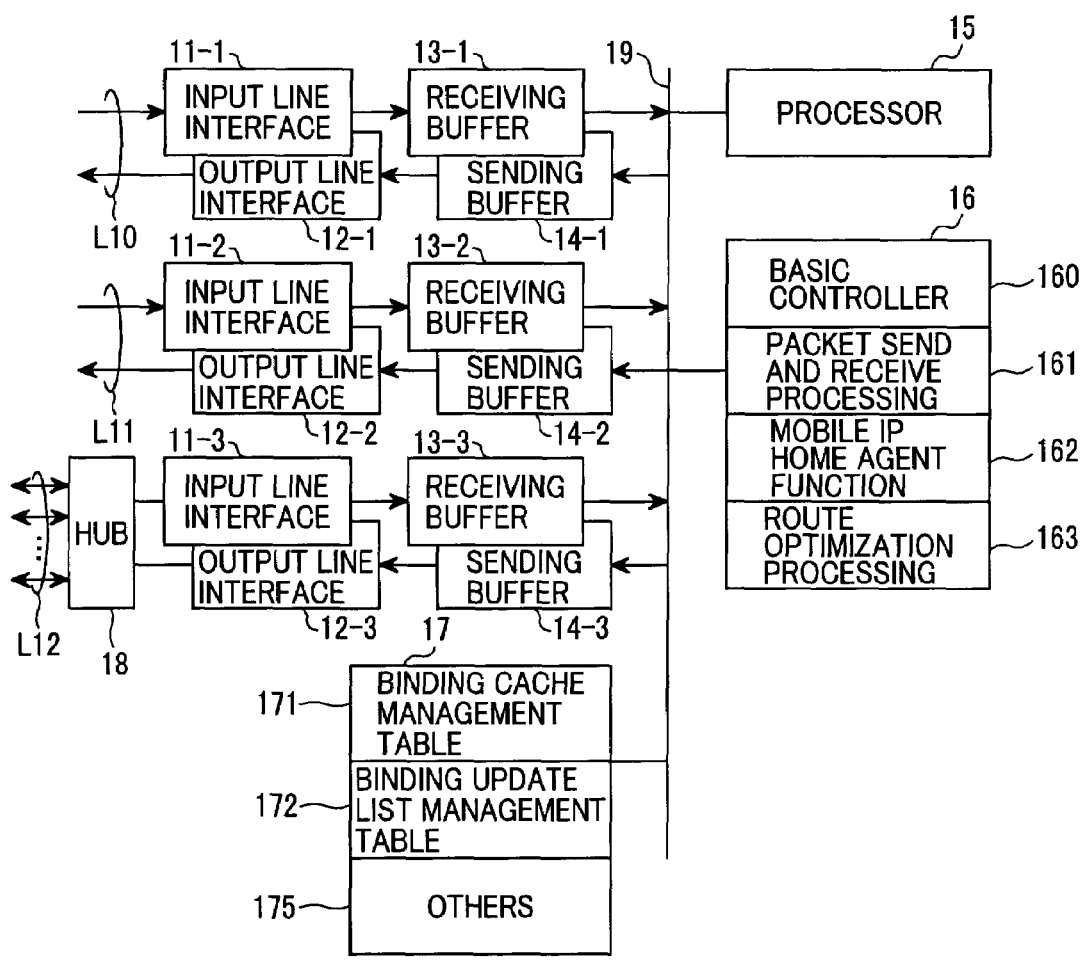
FIG. 25 is a diagram showing the configuration of the home agent 10 in the second example.

The home agent 10 of the embodiment is provided with, as shown in FIG. 25, a route optimization processing routine 163 in the program memory 16, in addition to the basic control routine 160, packet send and receive processing routine 161, and mobile IP home agent function routine 162, and a binding update list management table 172 in the data memory 17 to be referred to by the route optimization processing routine 163.

As shown in FIG. 21, when an SIP request message (INVITE) is received (201) from the terminal 40, the SIP server 20 retrieves an entry corresponding to request-URI described in the start-line 81 in the received message from the SIP information management table 271 by the SIP server function routine 262. When the home address of the mobile node 30x to be a destination of the received message is found out from the terminal location information 2712 of the retrieved entry, the SIP server function routine 263 starts the binding information collection processing routine 400.

Figure 26:
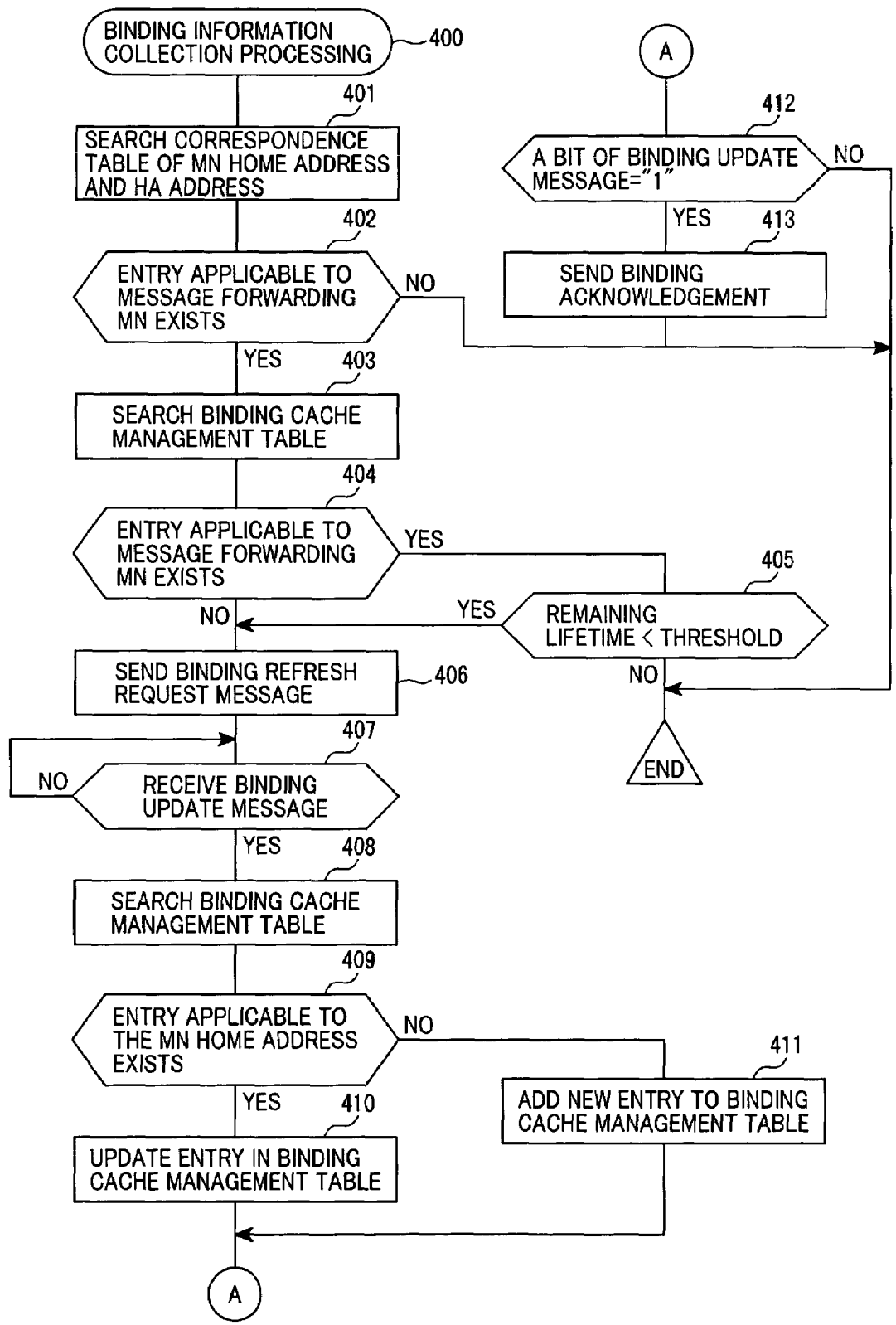
FIG. 26 is a flowchart showing a binding information collection processing routine 400 executed by the SIP server 20.

FIG. 26 shows the flowchart of the binding information collection processing routine 400.

The binding information collection processing routine 400 searches (401) the correspondence table 273 of MN home address and HA address by using the home address of the mobile node 30x as a search key. The search result is checked (402) and, if an entry whose MN home address 2731 matches the home address of the mobile node 30x is not registered in the table 273, the routine is terminated. When an entry matching the home address of the mobile node 30x exists in the table, after storing a home agent (HA) address 2732 of the mobile node 30x indicated by the entry, the binding cache management table 272 is searched (403) on the basis of the home agent address 2732 of the mobile node 30x as a search key.

The search result is checked (404) and, if there is no entry matching the home address of the mobile node 30x in the binding cache management table 272, a mobile IP message (binding refresh request message 70C) requesting for binding information of the mobile node 30x is sent (406, 241) to the home agent address 2732 of the mobile node 30x already stored and the routine waits (407) for reception of a binding update message from the home agent 10.

When an entry matching the home address of the mobile node 30x exists in the binding cache management table 272, the lifetime 1713 of the entry is checked (405). If the remaining lifetime is shorter than a predetermined threshold, the binding refresh request message 70C is sent to the home agent address 2732 of the mobile node 30x in step 406. If the remaining lifetime is equal to or longer than the threshold, the routine is terminated.

The binding refresh request message 70C includes the IPv6 mobility header 72 as shown in FIG. 24. The home address of the mobile node 30x requiring binding information is written in the mobility options 724 of the IPv6 mobility header 72.

The home agent 10 having received the binding refresh request message searches the binding cache management table 171 by using the home address of the mobile node 30x as a search key. When an entry having the home address is found, a mobile IP message (binding update) in which binding information such as the home address of the mobile node 30x indicated by the entry and CoA is set in the mobility options 724 is generated and sent to the SIP server 20 (242). After that, the home agent 10 generates (243) an entry for the SIP server 20 to be registered in the binding update list management table 172 and waits for a response message from the SIP server 20.

Referring again to FIG. 26, when the binding update message is received from the home agent 10, the SIP server 20 searches (408) the binding cache management table 272 of the SIP server 2 based on the home address of the mobile node 30x indicated in the received message. When an entry for the mobile node is found, the SIP server 20 updates (410, 244) the entry in accordance with the binding information in the received message. If an entry for the mobile node 30x does not exist in the binding cache management table 272, the SIP server 20 generates an entry for the mobile node 30x in accordance with the binding information in the received message and adds (411, 244) the entry to the binding cache management table 272.

Subsequently, the SIP server 20 checks (412) the A bit of the binding update message received from the home agent. When bit value "1" is set in the A bit, the SIP server 20 sends (413, 245) a binding ACK message to the home agent 10 and terminates the routine.

After completion of the binding information collection processing routine 400, the SIP server function routine 262 of the SIP server 2 retrieves an entry having the home address of the mobile node 30x from the binding cache management table 272 to specify the CoA of the mobile node 30x (246), and transmits the SIP message (INVITE) received from the terminal 40 (201B) to the line L20 as an encapsulated IP packet with an IP header including the CoA as a destination address and the address of the SIP server 20 as a source address. As the destination address of the original SIP message packet before encapsulation, the home address of the mobile node 30x is set. When the binding ACK message indicative of normal end is received from the SIP server 20, the home agent 10 registers (247) the entry generated in step 243 into the binding update list management table 172.

Upon receiving the encapsulated packet including the INVITE message, the mobile node 30x executes a process for optimizing the communication route (311, 311) in a manner similar to the first example. After completion of the communication route optimization, the mobile node 30x sends (202B) the SIP response message (200 OK) for the INVITE message. In this case, the IP packet including the SIP response message is sent to the SIP server 20 in a packet form encapsulated with the IPv6 header including the address of the SIP server 20 as a destination address.

According to the embodiment, since the SIP server 20 holds binding information of the mobile node 30x, the SIP server can use the optimum route in the case of sending the SIP message such as a session disconnection request to the mobile node 30x.

Figure 27:
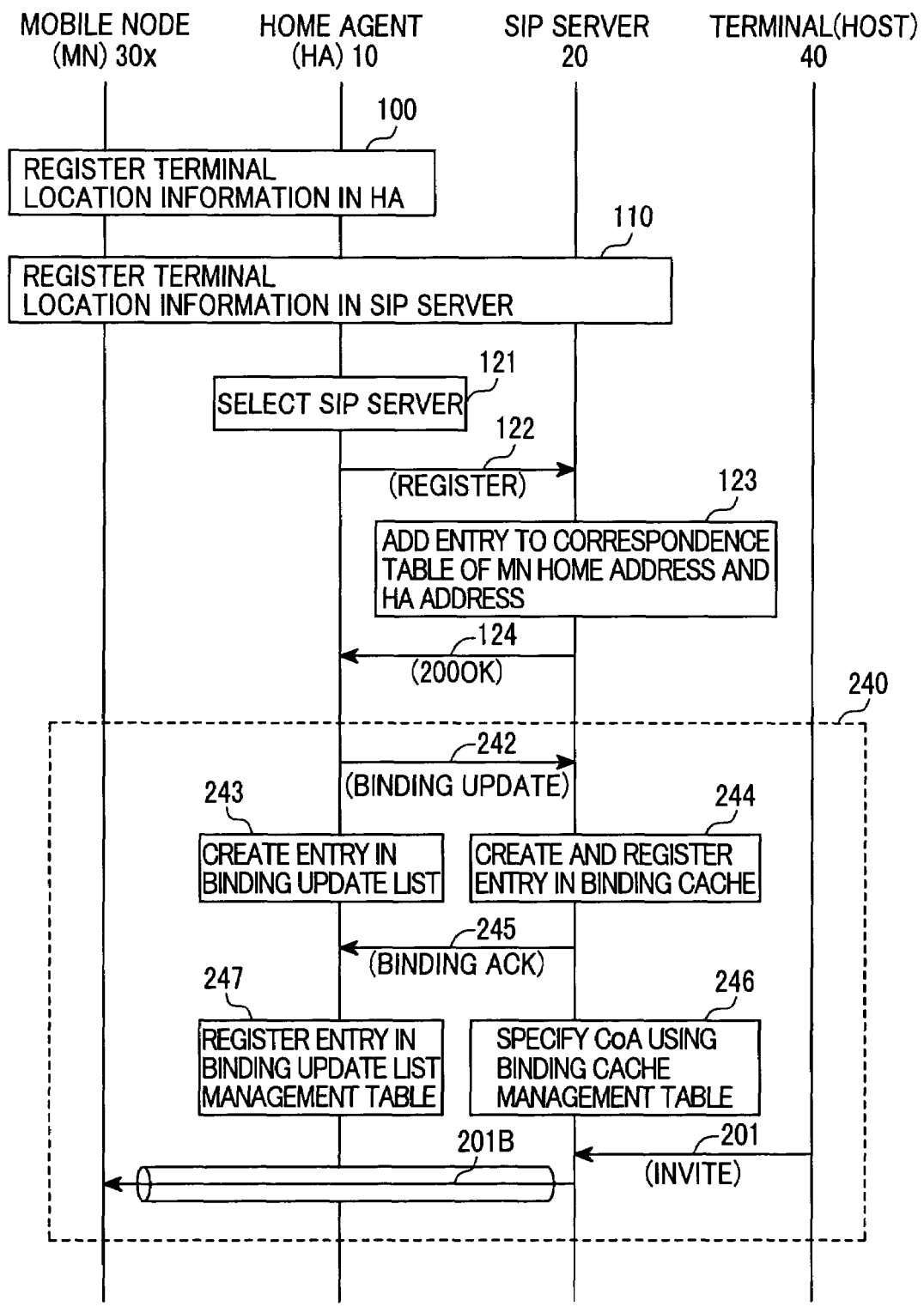
FIG. 27 is a diagram showing a third embodiment of the communication procedure according to the invention using the SIP session establishing function.

FIG. 27 shows a third embodiment of the data communication procedure according to the invention.

The third embodiment is characterized in that the SIP server dynamically generates the correspondence table 273 of the MN home address and HA address by automatically sending a notification of the address of the home agent from the home agent 10 to the SIP server.

Figure 28:
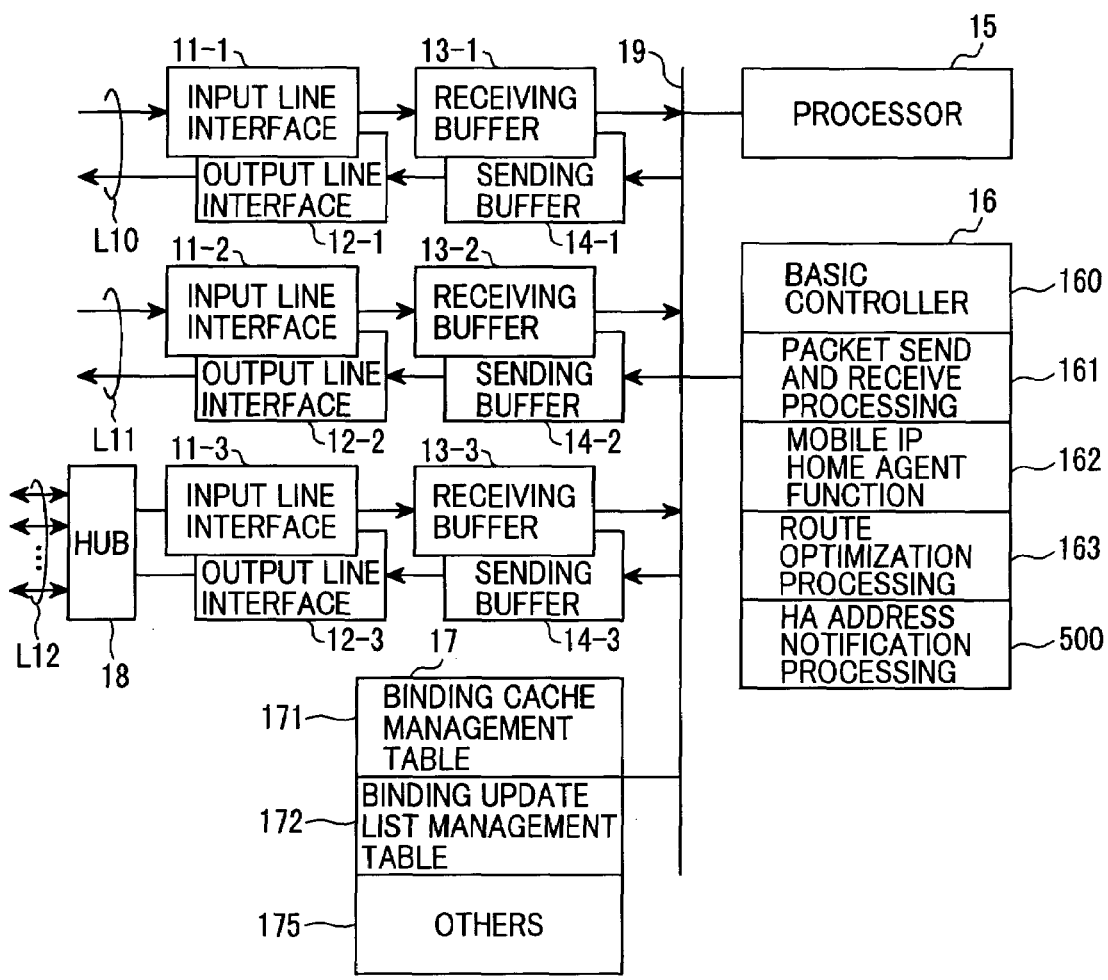
FIG. 28 is a diagram showing the configuration of the home agent 10 in the third example.

FIG. 28 is a configuration diagram of the home agent 10 in the example. The home agent 10 is provided with an HA address notification processing routine 500 for notifying the SIP server of correspondence information of the home address of the mobile node and the address of an home agent HA in addition to the programs 160 to 163 of the home agent in the second example shown in FIG. 25.

Figure 29:
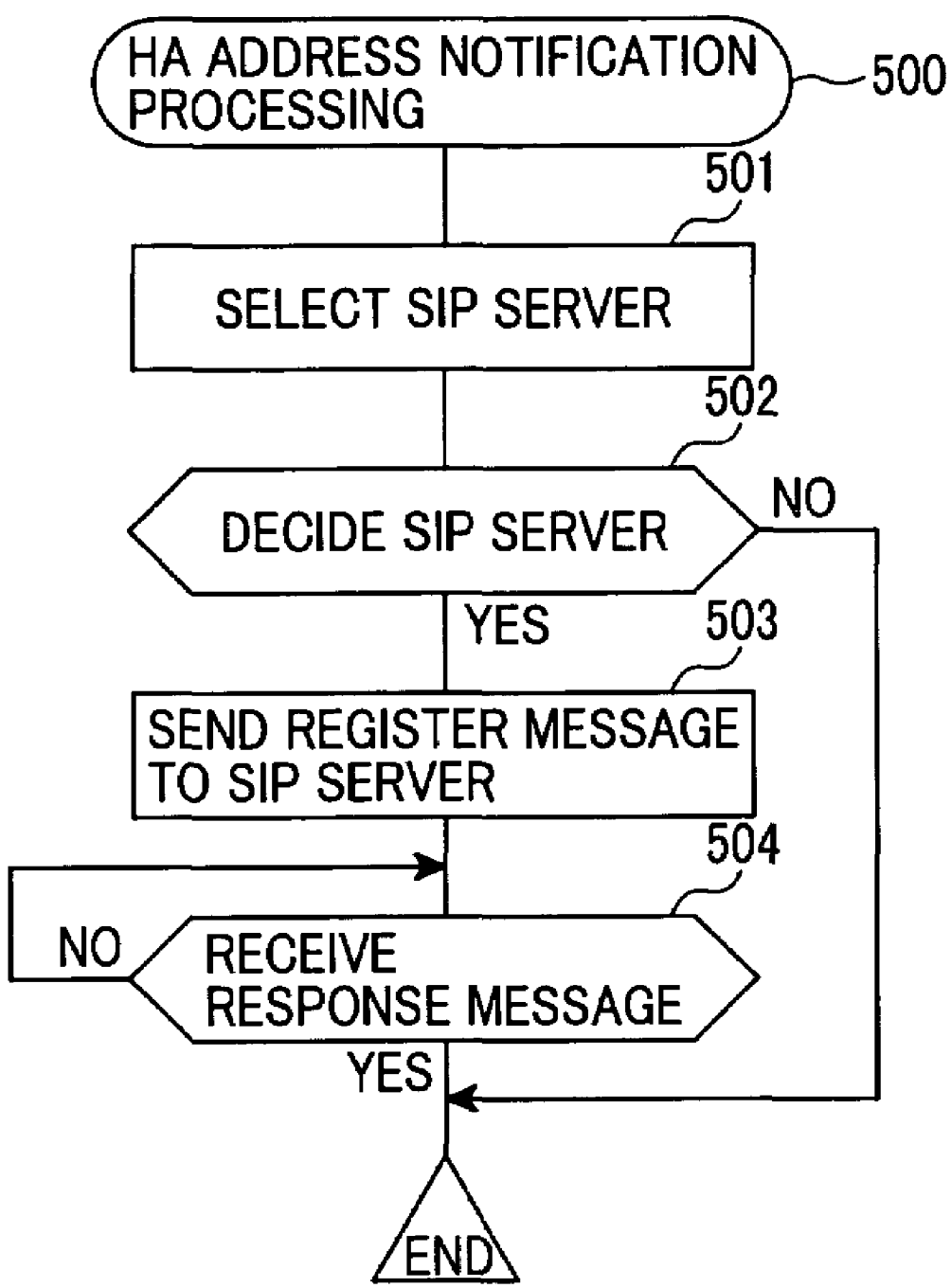
FIG. 29 is a flowchart of a home address notification processing routine 500 executed by the home agent 10.

In FIG. 27, in registration (100) of terminal location to the home agent and registration (110) of terminal location to the SIP server, the steps 101 to 108 and steps 111 to 117 shown in FIG. 8 are executed, respectively. When a new entry is added (step 105 in FIG. 8) to the binding cache management table 171 in response to a location registration request from a mobile node, for example, the mobile node 30x, the home agent 10 starts the HA address notification processing routine 500 shown in FIG. 29.

In the HA address notification processing routine 500, the SIP server corresponding to the mobile node 30x is determined by any of the following methods (501, 121).

(1) Prestore information of the SIP server to be associated with a mobile node as profile information of each mobile node.

(2) Select an SIP server in the same domain as that of the home agent.

(3) Determine an SIP server by multicasting from the home agent.

In the case where the SIP server 20, for example, is decided as an SIP server to be associated with the mobile node 30x (502), the SIP message (REGISTER) indicative of the correspondence relation between the home address of the mobile node 30x and the address (HA address) of the home agent 10 is transmitted (503, 122) to the SIP server 20, and the routine waits for the reception of a response message from the SIP server (504).

The SIP message (REGISTER) sent from the home agent 10 to the SIP server 20 includes, for example, as shown in FIG. 30, a home agent header indicative of the HA address "ha6" in the message-header 82, and the home address "mn6" of the mobile node 30x in the contact header. In place of adding the home agent header, the HA address may be set in the message-body 83. In this case, the SIP server 20 has to have a function of referring to the message-body of the SIP message (REGISTER) received from the home agent.

Upon receiving the SIP message (REGISTER), the SIP sever 20 adds (123) an entry for the mobile node 30x into the correspondence table 273 of MN home address and HA address and, after that, sends (124) a response message (200 OK) for the SIP message (REGISTER) to the home agent 10.

On receipt of the response message (504), the home agent 10 terminates the HA address notification processing routine 500. In the case where the determination of the SIP server is failed in step 502, the routine 500 is terminated without sending the SIP message (REGISTER).

As described above, by automatically sending a notification of the HA address of the mobile node from the home agent 10 to the SIP server 20, it becomes unnecessary for the administrator to preset entry data in the correspondence table 273 of the MN home address and HA address for the SIP server.

In the third embodiment, as shown by a broken-line block 240 in FIG. 27, when the SIP response message (200 OK) is received, the SIP server may dynamically generate an entry of the correspondence table 273 of MN home address and HA address, in a manner similar to the second example, by sending (242) a binding update message including binding information of the mobile node 30x from the home agent 10 to the SIP server 20.

Further, in the same procedure as that in the second example, in response to the reception of the SIP message (INVITE) from the terminal 40, the SIP server 20 may transmit a binding refresh request to the home agent 10 in order to obtain binding information of the mobile node 30x from the home agent 10.

In the example, the HA address notification processing routine 500 is started when a new entry is added to the binding cache management table 171 (step 105 in FIG. 8). Alternately, the HA address notification processing routine 500 may be started when the home agent 10 receives a location registration request from the mobile node 30x.

In the first to third embodiments, the IPv6 address and the SIP identifier (SIP-URI) are assigned to each mobile node, and the SIP is applied as a session control protocol. As a modification of the invention, a control protocol standardized by H.323 of ITU-T recommendation for a packet-base multimedia communication system may be applied to the session control protocol.

H.323 is applicable to VoIP, and the message format for call control and data transfer of an H.323 system is standardized in ITU-T recommendation H.225 and H.245. In the H.323 system, each terminal is identified by an alias address, and correspondence information between an alias address and a transport address is managed by a gatekeeper. As the transport address, for example, an IP address is applied.

In the modification, an alias address standardized by H.323 is assigned in place of SIP-URI to each mobile node, a gatekeeper is used in place of the SIP server 20, and the mobile node 30x supporting mobile IPv6 is designed so as to execute a procedure of optimizing a mobile IP communication route between the mobile node 30x and the terminal 40 in response to the reception of an H.323 session control message. In this case, the communication route optimization can be realized by a procedure similar to that in the first embodiment.

By providing the home agent 10 and the H.323 gatekeeper with the route optimizing function so that the home agent 10 can notify the H.323 gatekeeper of binding information of a mobile node in a manner similar to the second example, the gatekeeper can transmit a session control signal to the mobile node without passing through the home agent.

As further another modification of the invention, a system configuration in which telephone number is assigned to each mobile node and, for example, an ENUM DNS specified in RFC2916 is connected to the communication network 5 may be employed. The ENUM DNS is based on the architecture and protocol of a DNS (Domain Name System) and provided with the function of managing a correspondence relation between the telephone number and URI (SIP-URI, H.323 alias address, or the like) assigned to each mobile node.

In the case of the system configuration, the terminal 40 inquires the ENUM DNS of the URI of the mobile node 30x as a correspondent node by designating the telephone number of the mobile node 30x prior to the transmission of data packets to the mobile node. After obtaining the URI of the mobile node 30x from the ENUM DNS, the terminal 40 establishes a session to the mobile node 30x. Therefore, in this case as well, the mobile IP communication route between the mobile node 30x and the terminal 40 can be optimized by a procedure similar to that of the first embodiment by using a session control signal as a trigger.

The foregoing examples are described, as shown in FIG. 1, based on the system configuration such that the mobile node 30x apart from the home link is connected to the router 1 (1A, 1B, . . . ) via the radio base station 3 (3A, 3B, . . . ) and performs communications with the home agent 10, SIP server 20, or terminal 40. However, the invention is also applicable to such a system configuration that a mobile node having no radio communication function is connected to a visited router via the network interface 34.

As obviously understood from the foregoing embodiments, according to the mobile terminal equipment and the packet communication method between terminals of the invention, since the data packet communication is started after optimization of the communication route, transfer delay time of data packets in a mobile IP communication network and its fluctuation can be reduced. According to the invention, the communication route between terminals in the mobile IP communication network can be optimized at a proper timing. According to the second embodiment, the communication route of session control messages between a session control server and a mobile terminal or correspondent node can be also optimized.

What is claimed is:

1. Mobile terminal equipment having a packet communication function and a communication route optimizing function according to a mobile IP (Internet Protocol), comprising a session controller for setting a session between terminals in accordance with a session control message of a protocol different from the mobile IP, the session controller having:

means for deciding, after a session control message from the other party is received in a visited network apart from a home network of the mobile IP and before beginning transmitting a data packet, whether an optimization of a communication route to the other party by said communication route optimizing function is necessary or not according to the session control message, and means for executing optimization of said communication route to the other party by said communication route optimizing function if the optimization of a communication route to the other party is decided as necessary, before sending a response message for the session control message, wherein the packet communication function transmits said data packet only after completing optimization of said communication route and only through said optimized communication route.

2. The mobile terminal equipment according to claim 1, wherein said session controller specifies an IP address of said other party from said session control message received in the visited network and executes optimization of a communication route to the IP address by said optimizing function.

3. The mobile terminal equipment according to claim 1, further comprising:

means for storing a home address of the mobile IP preliminarily assigned and an identifier of the mobile terminal equipment to be used in said session control;

means for notifying, when an IP care of address which becomes necessary for receiving mobile IP packets is obtained in the visited network, a first server operating as a mobile IP home agent of a correspondence relation between said IP care of address and the home address; and means for notifying a second server for session control of a correspondence relation between said mobile terminal identifier and the home address, wherein a session control message packet transmitted from said other party to said second server is transferred from said second server to said first server in accordance with said home address, and transferred to the mobile terminal equipment in the visited network in accordance with said IP care of address stored in the first server.

4. The mobile terminal equipment according to claim 1, wherein said mobile IP protocol is an IPv6 protocol, and said session control message is according to an SIP (Session Initiation Protocol) specified in IETF RFC3261.

5. The mobile terminal equipment according to claim 1, wherein said mobile IP protocol is an IPv6 protocol, and said session control message is according to ITU-T recommendation H.323.

6. A packet communication method between first and second terminals each having a packet communication function and a communication route optimizing function according to a mobile IP (Internet Protocol), comprising the steps of:

transmitting a session control message from said second terminal to said first terminal when said first terminal exists in a visited network apart from a mobile IP home network;

executing a communication procedure, before beginning transmitting a data packet, for deciding whether an optimization of a communication route to said second terminal by said first terminal is necessary or not according to the session control message, optimizing the communication route to said second terminal by said first terminal if the optimization of a communication route is decided as necessary on reception of said session control message; and transmitting a response message for said session control message from said first terminal after completion of optimization of said communication route, wherein said first and second terminals communicate said data packet only after completion of optimization of said communication route and only through said optimized communication route.

7. The packet communication method between terminals according to claim 6, wherein the session control message sent from said second terminal is transferred to said first terminal via a second server for session control and a first server operating as a mobile IP home agent of said first terminal, and said response message sent from said first terminal is transferred to said second terminal via said first and second servers.

8. The packet communication method between terminals according to claim 7, wherein when said first terminal obtains an IP care of address necessary for receiving mobile IP packets in the visited network, said first terminal notifies said first server of a correspondence relation between a home address of the first terminal and said care of address, and notifies said second server of a correspondence relation between a terminal identifier and the home address of the first terminal, said second terminal transmits the session control message designating the identifier of said first terminal to said second server, the second server transfers said session control message to the home address of said first terminal, and said first server intercepts said session control message and transfers the session control message to said care of address.

9. The packet communication method between terminals according to claim 8, wherein said second server sends said session control message in an IP packet form including the home address of said first terminal as a destination IP address, and said first server encapsulates the IP packet including said session control message received from said second server with an IP header including the care of address of said first terminal as a destination address, and transfers the encapsulated IP packet to said first terminal.

10. The packet communication method between terminals according to claim 8, further comprising the step of obtaining by said second server a correspondence relation between the home address and the care of address of said first terminal from said first server, wherein said second terminal sends said session control message in an IP packet form including the address of said second server as a destination IP address, and said second server transfers to said first terminal the IP packet including the session control message received from said second terminal in a form encapsulated with an IP header including the care of address of said first terminal as a destination address.

11. The packet communication method between terminals according to claim 10, further comprising the step of notifying to said second server, from said first server notified of the correspondence relation between the home address and the care of address from said first terminal, of a correspondence relation between the home address of said first terminal and a home agent IP address of said first server, wherein said second server specifies said first server on the basis of the home agent IP address and performs communication to obtain a correspondence relation between the home address and the care of address of said first terminal.

* * * * *